US011481471B2

(12) United States Patent
Nair et al.

(10) Patent No.: US 11,481,471 B2
(45) Date of Patent: Oct. 25, 2022

(54) MAPPING CONVOLUTION TO A MATRIX PROCESSOR UNIT

(71) Applicant: Meta Platforms, Inc., Menlo Park, CA (US)

(72) Inventors: Krishnakumar Nair, Newark, CA (US); Abdulkadir Utku Diril, Menlo Park, CA (US); Dheevatsa Mudigere, Fremont, CA (US); Olivia Wu, Los Altos, CA (US); Ehsan Khish Ardestani Zadeh, San Jose, CA (US); Yuchen Hao, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 582 days.

(21) Appl. No.: 16/543,241

(22) Filed: Aug. 16, 2019

(65) Prior Publication Data
US 2021/0049229 A1 Feb. 18, 2021

(51) Int. Cl.
*G06F 17/15* (2006.01)
*G06N 20/00* (2019.01)
*G06F 9/30* (2018.01)
*G06F 17/16* (2006.01)

(52) U.S. Cl.
CPC ........ *G06F 17/153* (2013.01); *G06F 9/30112* (2013.01); *G06F 9/30134* (2013.01); *G06F 17/16* (2013.01); *G06N 20/00* (2019.01)

(58) Field of Classification Search
CPC .... G06F 17/153; G06F 17/16; G06F 9/30134; G06F 9/30112; G06F 9/3001; G06F 9/30036; G06N 20/00

USPC ......................................................... 708/424
See application file for complete search history.

(56) References Cited

U.S. PATENT DOCUMENTS

| 6,901,422 B1 | 5/2005 | Sazegari |
| 2006/0101245 A1 | 5/2006 | Nair |
| 2018/0107630 A1* | 4/2018 | Zhou ..................... G06F 9/3887 |
| 2018/0336163 A1 | 11/2018 | Phelps et al. |
| 2019/0079903 A1 | 3/2019 | Dreyer |

OTHER PUBLICATIONS

Extended European Search Report for European Application No. 20190131.1, dated Jan. 26, 2021, 10 Pages.
Akopyan et al. "Large-Scale YouTube—8M Video Understanding with Deep Neural Networks", CVPR 2017.
(Continued)

*Primary Examiner* — Tan V Mai
(74) *Attorney, Agent, or Firm* — Van Pelt, Yi & James LLP

(57) ABSTRACT

A system comprises a matrix processor unit that includes a first type of register, a group of a second type of registers, and a plurality of calculation units. The first type of register is configured to concurrently store values from different rows of a first matrix. At least a portion of the first type of register is logically divided into groups of elements, and each of the groups corresponds to a different row of the first matrix. Each of the second type of registers is configured to concurrently store values from a plurality of different rows of a second matrix. Each of the calculation units corresponds to one of the second type of registers and is configured to at least in part determine a corresponding element in a result matrix of convoluting the second matrix with the first matrix.

20 Claims, 26 Drawing Sheets

(56) References Cited

OTHER PUBLICATIONS

Hara et al. "Can Spatiotemporal 3D CNNs Retrace the History of 2D CNNs and ImageNet?", CVPR 2018.
Ji et al. "3D Convolutional Neural Networks for Human Action Recognition", PAMI 2014.
Karpathy et al. "Large-scale Video Classification with Convolutional Neural Networks", Computer Science Department, Stanford University. CVPR 2014.
Will Knight. "The Next Big Step for AI? Understanding Video". Dec. 6, 2017.
Office Action for European Application No. 20190131.1, dated Apr. 21, 2022, 7 pages.

* cited by examiner

701 —

| $W_{1,1}$ | $W_{1,2}$ | $W_{1,3}$ |
|---|---|---|
| $W_{2,1}$ | $W_{2,2}$ | $W_{2,3}$ |
| $W_{3,1}$ | $W_{3,2}$ | $W_{3,3}$ |

| $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{1,11}$ | ... |
|---|---|---|---|---|---|---|---|---|---|---|---|
| $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{2,11}$ | ... |
| $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{3,11}$ | ... |
| $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{4,11}$ | ... |

⋮

| $X_{32,1}$ | $X_{32,2}$ | $X_{32,3}$ | $X_{32,4}$ | $X_{32,5}$ | $X_{32,6}$ | $X_{32,7}$ | $X_{32,8}$ | $X_{32,9}$ | $X_{32,10}$ | $X_{32,11}$ | ... |
|---|---|---|---|---|---|---|---|---|---|---|---|
| $X_{33,1}$ | $X_{33,2}$ | $X_{33,3}$ | $X_{33,4}$ | $X_{33,5}$ | $X_{33,6}$ | $X_{33,7}$ | $X_{33,8}$ | $X_{33,9}$ | $X_{33,10}$ | $X_{33,11}$ | ... |
| $X_{34,1}$ | $X_{34,2}$ | $X_{34,3}$ | $X_{34,4}$ | $X_{34,5}$ | $X_{34,6}$ | $X_{34,7}$ | $X_{34,8}$ | $X_{34,9}$ | $X_{34,10}$ | $X_{34,11}$ | ... |

FIG. 7B

| 801 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 803 | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{2,1}$ | $X_{2,2}$ | $X_{2,3}$ | $X_{2,4}$ | $X_{2,5}$ | $X_{2,6}$ |
| 805 | $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ |
| 807 | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{4,1}$ | $X_{4,2}$ | $X_{4,3}$ | $X_{4,4}$ | $X_{4,5}$ | $X_{4,6}$ |
| 809 | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{5,1}$ | $X_{5,2}$ | $X_{5,3}$ | $X_{5,4}$ | $X_{5,5}$ | $X_{5,6}$ |
| 811 | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | $X_{6,1}$ | $X_{6,2}$ | $X_{6,3}$ | $X_{6,4}$ | $X_{6,5}$ | $X_{6,6}$ |
| 813 | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | $X_{7,1}$ | $X_{7,2}$ | $X_{7,3}$ | $X_{7,4}$ | $X_{7,5}$ | $X_{7,6}$ |
| 815 | $X_{32,1}$ | $X_{32,2}$ | $X_{32,3}$ | $X_{32,4}$ | $X_{32,5}$ | $X_{32,6}$ | $X_{32,7}$ | $X_{32,8}$ | $X_{32,9}$ | $X_{32,10}$ | $X_{33,1}$ | $X_{33,2}$ | $X_{33,3}$ | $X_{33,4}$ | $X_{33,5}$ | $X_{33,6}$ |

FIG. 8A

| 802 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 804 | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |
| 806 | $X_{3,7}$ | $X_{3,8}$ | $X_{3,9}$ | $X_{3,10}$ | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | 0 | 0 |
| 808 | $X_{4,7}$ | $X_{4,8}$ | $X_{4,9}$ | $X_{4,10}$ | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | 0 | 0 |
| 810 | $X_{5,7}$ | $X_{5,8}$ | $X_{5,9}$ | $X_{5,10}$ | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | 0 | 0 |
| 812 | $X_{6,7}$ | $X_{6,8}$ | $X_{6,9}$ | $X_{6,10}$ | $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | 0 | 0 |
| 814 | $X_{7,7}$ | $X_{7,8}$ | $X_{7,9}$ | $X_{7,10}$ | $X_{8,1}$ | $X_{8,2}$ | $X_{8,3}$ | $X_{8,4}$ | $X_{8,5}$ | $X_{8,6}$ | $X_{8,7}$ | $X_{8,8}$ | $X_{8,9}$ | $X_{8,10}$ | 0 | 0 |
| 816 | $X_{33,7}$ | $X_{33,8}$ | $X_{33,9}$ | $X_{33,10}$ | $X_{34,1}$ | $X_{34,2}$ | $X_{34,3}$ | $X_{34,4}$ | $X_{34,5}$ | $X_{34,6}$ | $X_{34,7}$ | $X_{34,8}$ | $X_{34,9}$ | $X_{34,10}$ | 0 | 0 |

FIG. 8B

| 901 | 0 | 1 | 2 | 3 | 4 | 5 | 6 | 7 | 8 | 9 | 10 | 11 | 12 | 13 | 14 | 15 |

| 903 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 | 0 |

| 905 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 |

| 907 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 |

| 909 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ |

| 911 | 0 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ |

| 913 | 0 | 0 | 0 | 0 | 0 | $W_{1,1}$ | $W_{1,2}$ | $W_{1,3}$ | 0 | 0 | 0 | 0 | 0 | 0 | 0 | $W_{2,1}$ |

| 915 | 0 | 0 | 0 | 0 | 0 | 0 | $W_{1,1}$ | $W_{1,2}$ | $W_{1,3}$ | 0 | 0 | 0 | 0 | 0 | 0 | 0 |

| 917 | 0 | 0 | 0 | 0 | 0 | 0 | 0 | $W_{1,1}$ | $W_{1,2}$ | $W_{1,3}$ | 0 | 0 | 0 | 0 | 0 | 0 |

FIG. 9A

| | | | | | | | | | | | | | | | | |
|---|---|---|---|---|---|---|---|---|---|---|---|---|---|---|---|---|
| 902 | 16 | 17 | 18 | 19 | 20 | 21 | 22 | 23 | 24 | 25 | 26 | 27 | 28 | 29 | 30 | 31 |
| 904 | 0 | 0 | 0 | 0 | $W_{3,1}$ | $W_{3,2}$ | $W_{3,3}$ | 0 | 0 | 0 | 0 | 0 | 0 | 0 | 0 | 0 |
| 906 | 0 | 0 | 0 | 0 | 0 | $W_{3,1}$ | $W_{3,2}$ | $W_{3,3}$ | 0 | 0 | 0 | 0 | 0 | 0 | 0 | 0 |
| 908 | 0 | 0 | 0 | 0 | 0 | 0 | $W_{3,1}$ | $W_{3,2}$ | $W_{3,3}$ | 0 | 0 | 0 | 0 | 0 | 0 | 0 |
| 910 | 0 | 0 | 0 | 0 | 0 | 0 | 0 | $W_{3,1}$ | $W_{3,2}$ | $W_{3,3}$ | 0 | 0 | 0 | 0 | 0 | 0 |
| 912 | $W_{2,3}$ | 0 | 0 | 0 | 0 | 0 | 0 | 0 | $W_{3,1}$ | $W_{3,2}$ | $W_{3,3}$ | 0 | 0 | 0 | 0 | 0 |
| 914 | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 | 0 |
| 916 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 |
| 918 | 0 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 |

| 1002 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1004 | 0 | 0 | 0 | 0 | $W_{3,1}$ | $W_{3,2}$ | $W_{3,3}$ | 0 | 0 | 0 | 0 | 0 | 0 | 0 | 0 | 0 |
| 1006 | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |

FIG. 10B

| | | | | | | |
|---|---|---|---|---|---|---|
| 1101 → $W_{1,1}$ | $W_{1,2}$ | $W_{1,3}$ | $W_{1,4}$ | $W_{1,5}$ | $W_{1,6}$ | $W_{1,7}$ |
| $W_{2,1}$ | $W_{2,2}$ | $W_{2,3}$ | $W_{2,4}$ | $W_{2,5}$ | $W_{2,6}$ | $W_{2,7}$ |
| $W_{3,1}$ | $W_{3,2}$ | $W_{3,3}$ | $W_{3,4}$ | $W_{3,5}$ | $W_{3,6}$ | $W_{3,7}$ |
| $W_{4,1}$ | $W_{4,2}$ | $W_{4,3}$ | $W_{4,4}$ | $W_{4,5}$ | $W_{4,6}$ | $W_{4,7}$ |
| $W_{5,1}$ | $W_{5,2}$ | $W_{5,3}$ | $W_{5,4}$ | $W_{5,5}$ | $W_{5,6}$ | $W_{5,7}$ |
| $W_{6,1}$ | $W_{6,2}$ | $W_{6,3}$ | $W_{6,4}$ | $W_{6,5}$ | $W_{6,6}$ | $W_{6,7}$ |
| $W_{7,1}$ | $W_{7,2}$ | $W_{7,3}$ | $W_{7,4}$ | $W_{7,5}$ | $W_{7,6}$ | $W_{7,7}$ |

| 1201 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1203 | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{1,11}$ | $X_{1,12}$ | $X_{1,13}$ | $X_{1,14}$ | $X_{1,15}$ | $X_{1,16}$ |
| 1205 | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{3,11}$ | $X_{3,12}$ | $X_{3,13}$ | $X_{3,14}$ | $X_{3,15}$ | $X_{3,16}$ |
| 1207 | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | $X_{5,11}$ | $X_{5,12}$ | $X_{5,13}$ | $X_{5,14}$ | $X_{5,15}$ | $X_{5,16}$ |
| 1209 | $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | $X_{7,11}$ | $X_{7,12}$ | $X_{7,13}$ | $X_{7,14}$ | $X_{7,15}$ | $X_{7,16}$ |

FIG. 12A

| 1202 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1204 | $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{2,11}$ | $X_{2,12}$ | $X_{2,13}$ | $X_{2,14}$ | $X_{2,15}$ | $X_{2,16}$ |
| 1206 | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{4,11}$ | $X_{4,12}$ | $X_{4,13}$ | $X_{4,14}$ | $X_{4,15}$ | $X_{4,16}$ |
| 1208 | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | $X_{6,11}$ | $X_{6,12}$ | $X_{6,13}$ | $X_{6,14}$ | $X_{6,15}$ | $X_{6,16}$ |
| 1210 | 0 | 0 | 0 | 0 | 0 | 0 | 0 | 0 | 0 | 0 | 0 | 0 | 0 | 0 | 0 | 0 |

FIG. 12B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1301 | 0 | 1 | 2 | 3 | 4 | 5 | 6 | 7 | 8 | 9 | 10 | 11 | 12 | 13 | 14 | 15 |
| 1303 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 | 0 | 0 |
| 1305 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 | 0 |
| 1307 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 |
| 1309 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 |
| 1311 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 |
| 1313 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 |
| 1315 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 |
| 1317 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 |
| 1319 | 0 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 |
| 1321 | 0 | 0 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ |

FIG. 13A

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1302 | 16 | 17 | 18 | 19 | 20 | 21 | 22 | 23 | 24 | 25 | 26 | 27 | 28 | 29 | 30 | 31 |
| 1304 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 | 0 | 0 |
| 1306 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 | 0 |
| 1308 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 |
| 1310 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 |
| 1312 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 |
| 1314 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 |
| 1316 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 |
| 1318 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 |
| 1320 | 0 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 |
| 1322 | 0 | 0 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ |

FIG. 13B

| 1401 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1403 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 | 0 | 0 |
| 1405 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 | 0 |
| 1407 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 |
| 1409 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 |
| 1411 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 |
| 1413 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 |
| 1415 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 |
| 1417 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 |
| 1419 | 0 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 |
| 1421 | 0 | 0 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ |

FIG. 14A

| 1402 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1404 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 | 0 | 0 |
| 1406 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 | 0 |
| 1408 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 |
| 1410 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 |
| 1412 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 |
| 1414 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 |
| 1416 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 |
| 1418 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 |
| 1420 | 0 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 |
| 1422 | 0 | 0 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ |

FIG. 14B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1501 | 0 | 1 | 2 | 3 | 4 | 5 | 6 | 7 | 8 | 9 | 10 | 11 | 12 | 13 | 14 | 15 |
| 1503 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 | 0 | 0 | 0 | 0 | 0 |
| 1505 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 | 0 | 0 | 0 | 0 |
| 1507 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 | 0 | 0 | 0 |
| 1509 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 | 0 | 0 |
| 1511 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 | 0 |
| 1513 | 0 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 | 0 |
| 1515 | 0 | 0 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 | 0 |
| 1517 | 0 | 0 | 0 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 | 0 |
| 1519 | 0 | 0 | 0 | 0 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ | 0 |
| 1521 | 0 | 0 | 0 | 0 | 0 | 0 | 0 | 0 | 0 | $W_{s,1}$ | $W_{s,2}$ | $W_{s,3}$ | $W_{s,4}$ | $W_{s,5}$ | $W_{s,6}$ | $W_{s,7}$ |

FIG. 15A

| 1502 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1504 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 | 0 | 0 |
| 1506 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 | 0 |
| 1508 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 |
| 1510 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 |
| 1512 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 |
| 1514 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 |
| 1516 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 |
| 1518 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 |
| 1520 | 0 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 |
| 1522 | 0 | 0 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ |

FIG. 15B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1601 | 0 | 1 | 2 | 3 | 4 | 5 | 6 | 7 | 8 | 9 | 10 | 11 | 12 | 13 | 14 | 15 |
| 1603 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 | 0 | 0 |
| 1605 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 | 0 |
| 1607 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 |
| 1609 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 |
| 1611 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 |
| 1613 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 |
| 1615 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 |
| 1617 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 |
| 1619 | 0 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 |
| 1621 | 0 | 0 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ |

FIG. 16A

| 1602 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1604 | 0 | 0 | 0 | 0 | 0 | 0 | 0 | 0 | 0 | 0 | 0 | 0 | 0 | 0 | 0 | 0 |
| 1606 | 0 | 0 | 0 | 0 | 0 | 0 | 0 | 0 | 0 | 0 | 0 | 0 | 0 | 0 | 0 | 0 |
| 1608 | 0 | 0 | 0 | 0 | 0 | 0 | 0 | 0 | 0 | 0 | 0 | 0 | 0 | 0 | 0 | 0 |
| 1610 | 0 | 0 | 0 | 0 | 0 | 0 | 0 | 0 | 0 | 0 | 0 | 0 | 0 | 0 | 0 | 0 |
| 1612 | 0 | 0 | 0 | 0 | 0 | 0 | 0 | 0 | 0 | 0 | 0 | 0 | 0 | 0 | 0 | 0 |
| 1614 | 0 | 0 | 0 | 0 | 0 | 0 | 0 | 0 | 0 | 0 | 0 | 0 | 0 | 0 | 0 | 0 |
| 1616 | 0 | 0 | 0 | 0 | 0 | 0 | 0 | 0 | 0 | 0 | 0 | 0 | 0 | 0 | 0 | 0 |
| 1618 | 0 | 0 | 0 | 0 | 0 | 0 | 0 | 0 | 0 | 0 | 0 | 0 | 0 | 0 | 0 | 0 |
| 1620 | 0 | 0 | 0 | 0 | 0 | 0 | 0 | 0 | 0 | 0 | 0 | 0 | 0 | 0 | 0 | 0 |
| 1622 | 0 | 0 | 0 | 0 | 0 | 0 | 0 | 0 | 0 | 0 | 0 | 0 | 0 | 0 | 0 | 0 |

FIG. 16B

MAPPING CONVOLUTION TO A MATRIX PROCESSOR UNIT

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize the performance of convolution operations and in particular depthwise convolution operations. Traditional optimization approaches for depthwise convolution require specialized hardware and complex memory organization schemes. It is a technical challenge to create a hardware platform compatible with solving different matrix operations while also significantly improving the performance and efficiency for solving convolution operations. Therefore, there exists a need for a hardware and data path solution that improves on the ability to efficiently compute convolution operations needed for solving complex artificial intelligence problems without introducing significant complexity and restrictions.

BRIEF DESCRIPTION OF THE DRAWINGS

Various embodiments of the invention are disclosed in the following detailed description and the accompanying drawings.

FIGS. 7A and 7B are diagrams illustrating example matrix operands for performing depthwise convolution.

FIGS. 8A and 8B are diagrams illustrating an example of an unrolled data matrix for performing depthwise convolution.

FIGS. 9A and 9B are diagrams illustrating an example of an unrolled weight matrix for performing depthwise convolution.

FIGS. 10A and 10B are diagrams illustrating an example of vector computations for performing depthwise convolution.

FIGS. 11A and 11B are diagrams illustrating example matrix operands for performing depthwise convolution.

FIGS. 12A and 12B are diagrams illustrating an example of a partially unrolled data matrix for performing depthwise convolution.

FIGS. 13A and 13B are diagrams illustrating an example of a partially unrolled weight matrix for performing depthwise convolution.

FIGS. 14A and 14B are diagrams illustrating an example of a partially unrolled weight matrix for performing depthwise convolution.

FIGS. 15A and 15B are diagrams illustrating an example of a partially unrolled weight matrix for performing depthwise convolution.

FIGS. 16A and 16B are diagrams illustrating an example of a partially unrolled weight matrix for performing depthwise convolution.

DETAILED DESCRIPTION

Figure 1:
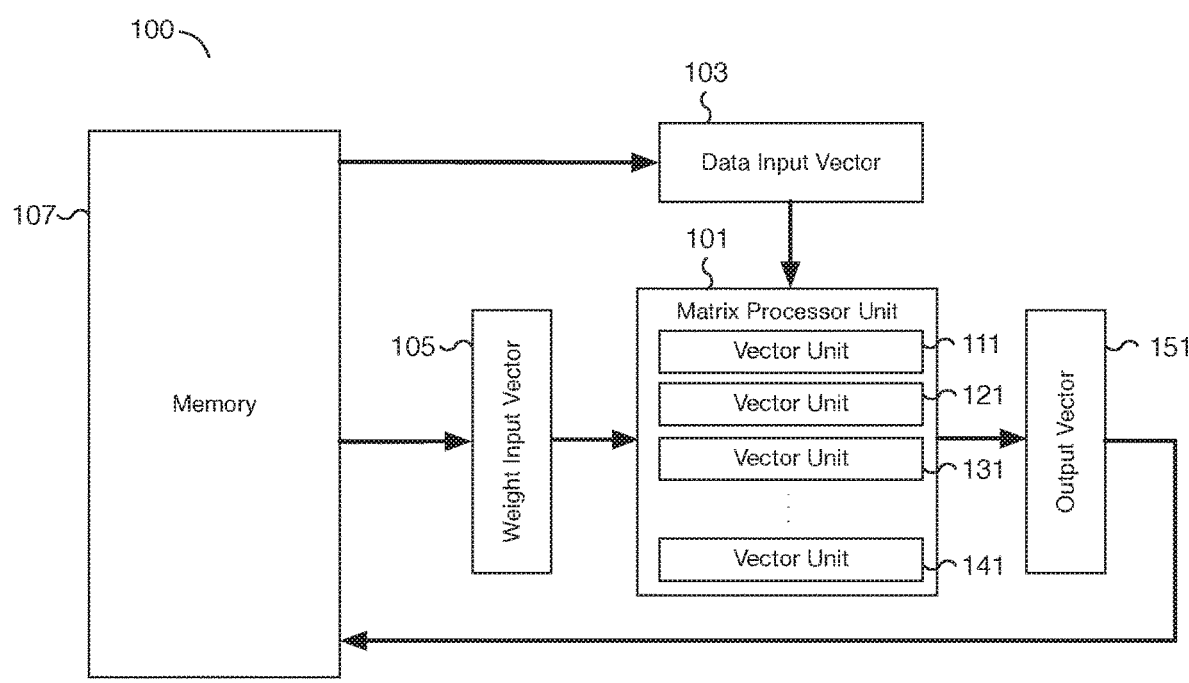
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing efficient convolution operations is disclosed. Using the disclosed techniques, the throughput and power efficiency for computing convolution operations and in particular depthwise convolutions is significantly increased. In some embodiments, the processor system includes a matrix processor unit capable of performing matrix operations on two input matrices. The matrix processor unit includes a plurality of calculation units such as vector units used to process input vectors of the input matrices. In various embodiments, a calculation unit includes at least a vector multiply unit and a vector adder unit. The vector multiply unit is capable of performing multiply operations using corresponding elements of two input vectors. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In various embodiments, the matrix processor unit is used to compute the result of a convolution operation such as a depthwise convolution of two input matrices, such as a weight input and a data input matrix, by unrolling the input matrices. For example, a weight matrix is unrolled by starting with a two-dimensional matrix and unrolling multiple rows into a single row formatted as a vector. A 3×3 matrix may be unrolled into a single vector and may include padding, such as zero elements, between rows. In some embodiments, a weight matrix may be partially unrolled and require multiple iterations of unrolling to completely unroll the entire matrix. For example, a 5×5, 7×7, and/or 9×9 matrix may be unrolled using two or more iterations, wherein each iteration involves unrolling two or more rows. As an example, in some embodiments, a 7×7 matrix is unrolled over four iterations. The first iteration unrolls rows 1 and 2 of the 7×7 matrix, the second iteration unrolls rows 3 and 4 of the 7×7 matrix, the third iteration unrolls rows 5 and 6 of the 7×7 matrix, and the fourth iteration unrolls row 7 of the 7×7 matrix. In various embodiments, a different number of iterations may be used depending on the size of the input matrices, the number of rows unrolled for each interaction, and the matrix processor unit vector size capabilities. Concurrently with unrolling the weight input matrix, the data input matrix is also unrolled. In various embodiments, the corresponding rows of the data input matrix are unrolled over the same number of iterations and each unrolling is formatted to align the elements of the vector input data with the corresponding elements from the weight input data. The input vectors are processed using the matrix processor unit to compute a result sum. In some embodiments, the result sum is a partial (or intermediate) sum and is accumulated with partial (or intermediate) sums computed from each iteration.

In various embodiments, the elements of the unrolled weight vector are shifted, for example, during an iteration, to compute at least a partial convolution result of the weight vector with the next column of corresponding data input elements. For example, the elements of the unrolled weight input vector may be shifted by one row element to align the weight vector elements with the corresponding next column of the unrolled data input vector. In some embodiments, the number of shifts performed during an iteration corresponds to the amount of padding between the rows of the weight input vector. For example, in the event seven zero-padded elements separate each unrolled row from the weight input matrix, after an initial set of matrix computation operations are performed, seven shifts and corresponding matrix computation operations may be performed before progressing to the next iteration. In various embodiments, the unrolled weight input vector may be broadcasted to each of the vector calculation units to compute the vector result for multiple rows in parallel. In some embodiments, multiple matrix processor units may be utilized and different matrix processor units may compute the partial sums of different iterations of the same input matrices in parallel. The partial sum results from each matrix processor unit may be combined to compute a result sum.

In some embodiments, a processor system includes a matrix processor unit, a first type of register, a group of a second type of registers, and a plurality of calculation units. The processor system may be utilized to perform highly efficient convolution operations such as depthwise convolution operations without requiring complex memory organization schemes. In some embodiments, the first type of register is configured to concurrently store values of a plurality of different rows of a first matrix. For example, the first matrix may be a weight matrix used for performing one or more depthwise convolutions. In various embodiments, at least a portion of the first type of register is logically divided into groups of elements, and each of the groups corresponds to a different row of the first matrix. For example, a 3×3 weight matrix may be divided into three row groups, each row group corresponding to a different row of the 3×3 weight matrix. The first type of register may be divided into as many as three groups, where each group corresponds to a different row group of the 3×3 weight matrix. As another example, a 7×7 weight matrix may be divided into seven row groups and the first type of register may be divided into as many as seven groups, where each group corresponds to a different row group of the 7×7 weight matrix. In some embodiments, the first type of register may be divided into fewer groups than the number of rows of the first matrix. For example, in some embodiments, the first type of register may be divided into as few as two groups, each group corresponding to at most a pair of rows of the first matrix, such as one or two rows of a 7×7 weight matrix. In some embodiments, each of the second type of registers is configured to concurrently store values from a plurality of different rows of a second matrix. For example, the second matrix may be a data input matrix used as an argument for one or more convolution operations. The data of the data input matrix may correspond to image data, video data, user data, intermediate neural network data results, etc. In various embodiments, a depthwise convolution is performed using the first and second matrices. For example, the first matrix may be a weight input matrix and the second matrix may be a data input matrix. In some embodiments, each of the plurality of calculation units corresponds to one of the second type of registers. For example, each of the calculation units may correspond to a vector of data input elements stored in one of the second type of registers. In various embodiments, each calculation unit is a vector calculation unit. For example, the matrix processor unit includes multiple vector calculation units for computing matrix operations. In some embodiments, each of the calculation units is configured to multiply each value stored in the first type of register with a corresponding value stored in the corresponding one of the second type of registers and sum together the multiplication results of the corresponding calculation unit. For example, for each calculation unit, an element stored in the first type of register is multiplied with a corresponding element of one of the second type of registers to create a vector of multiplication results. The multiplication results are summed together to determine an output result. In some embodiments, the output result is a dot product and the result of the calculation units is a vector of output results. In some embodiments, the vector output results may be used to at least in part determine a result of multiplying the first matrix and at least a portion of the second matrix. For example, successive accumulation of vector output results may be used to determine the result of multiplying a weight input matrix with a data input matrix. In some embodiments, the vector output results may be used to at least in part determine a corresponding element in a result matrix of convoluting the second matrix with the first matrix. For example, successive accumulation of vector output results may be used to determine the result of a depthwise convolution using a weight input matrix with a data input matrix.

FIG. 1 is a block diagram illustrating an embodiment of a system for solving artificial intelligence problems using a neural network. In the example shown, system 100 includes matrix processor unit 101, data input vector 103, weight input vector 105, memory 107, and output vector 151. Matrix processor unit 101 includes multiple vector units including at least vector units 111, 121, 131, and 141. In various embodiments, matrix processor unit 101 includes the number of vector units to match the number of elements in weight input vector 105. For example, data input vector 103, weight input vector 105, and output vector 151 may be sized to each store 32 elements and matrix processor unit 101 can include 32 vector units. Other vector lengths may be utilized as appropriate. Similarly, the size of the elements processed by system 100 can be configured as appropriate. For example, elements may be 4-bits, 8-bits, 2-byte, 4-bytes, or another appropriate size. In various embodiments, matrix processor unit 101 is configured to receive two input matrices, each matrix a two-dimensional matrix via data input vector 103 and weight input vector 105, respectively. Data input vector 103, weight input vector 105, and output vector 151 may be implemented as hardware registers, such as flip-flop circuits, for transferring multiple input and output elements to/from matrix processor unit 101. In some embodiments, each data vector is retrieved from memory 107 and loaded into a corresponding vector unit, such as vector units 111, 121, 131, or 141, of matrix processor unit 101 via data input vector 103. For example, a matrix processor unit with 32 vector units is loaded with 32 vectors of data elements via data input vector 103. Correspondingly, a vector of weight elements may be loaded from memory 107 via weight input vector 105 and broadcasted to all the applicable vector units of matrix processor unit 101. By broadcasting weight input vector 105 to all vector units of matrix processor unit 101, the same weight values can be applied to different data vectors by the matrix processor unit and each respective vector unit. In some embodiments, data input vector 103, weight input vector 105, and/or output vector 151 may be implemented as more than one input/output vector. In various embodiments, the thick arrows of FIG. 1 represent the direction data moves through the components of system 100. For example, the arrows may correspond to multi-element wide communication/data buses and/or data lines. In various embodiments, an output vector result stored in output vector 151 can be written back to memory 107.

In various embodiments, each vector unit of matrix processor unit 101, such as vector units 111, 121, 131, or 141, receives two vector operands and can perform one or more vector operations. For example, a vector unit can compute the dot product of the two input operands and output the result as one element of output vector 151. In some embodiments, the vector unit result is accumulated and used as an operand to a subsequent operation performed by the vector unit. In some embodiments, each vector unit of matrix processor unit 101, such as vector units 111, 121, 131, or 141, includes both a multiply unit and an adder unit (not shown). In some embodiments, each vector unit of matrix processor unit 101 may include a vector accumulator (not shown), for example, for storing partial results between vector operations.

Using the disclosed techniques, system 100 and in particular matrix processor unit 101 can be utilized to efficiently perform depthwise convolution operations for solving artificial intelligence problems using a neural network. Two-dimensional matrix operands may be unrolled and formatted into input vectors via data input vector 103 and/or weight input vector 105. The input vectors can be used to implement depthwise convolution using the vector units, such as vector units 111, 121, 131, or 141, of a matrix processor unit 101. In some embodiments, the input vectors, such as weight input vector 105, include logic for efficiently shifting elements within the input vector. For example, the elements can be shifted to the right by one position. In various embodiments, the shifting logic/circuit may be configured to shift the elements right (or left) and by different numbers of positions. In some embodiments, the elements loop around when shifted past the start or end of the input vector and/or may be replaced with a default value such as a zero padding element.

Figure 2:
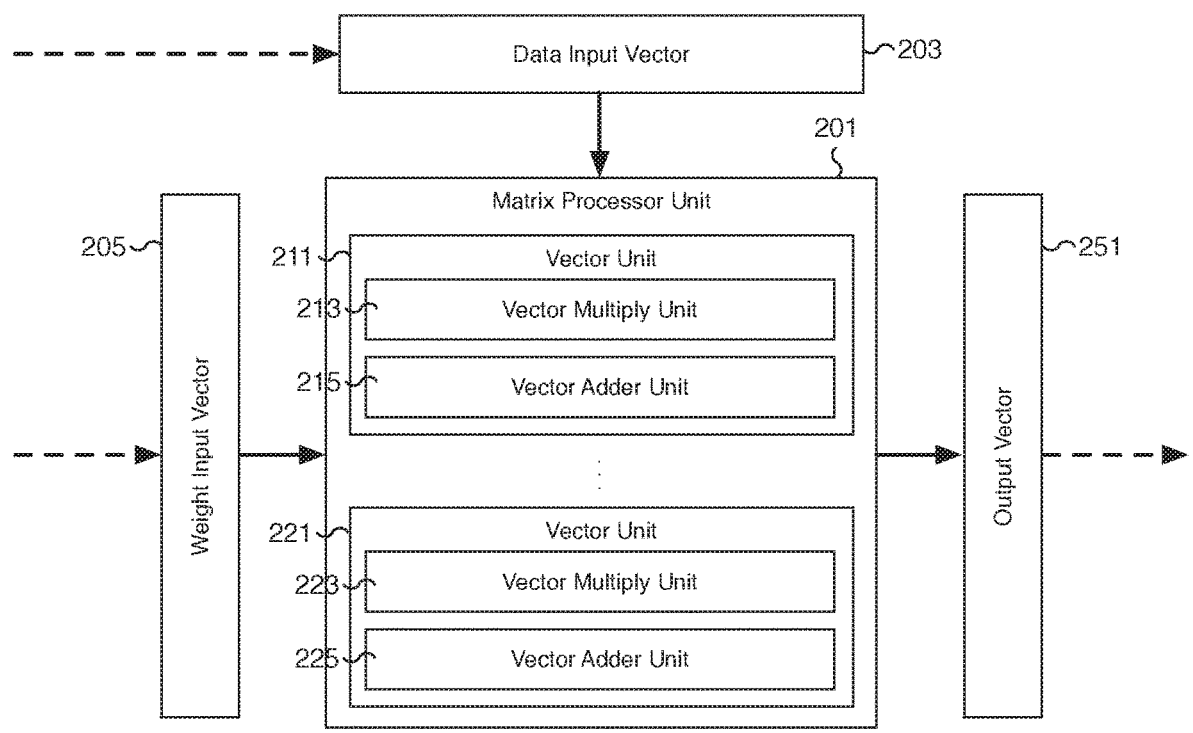
FIG. 2 is a block diagram illustrating an embodiment of a processor system for solving artificial intelligence problems using a neural network.

FIG. 2 is a block diagram illustrating an embodiment of a processor system for solving artificial intelligence problems using a neural network. In the example shown, the processor system includes matrix processor unit 201, data input vector 203, weight input vector 205, and output vector 251. Matrix processor unit 201 includes multiple vector units including at least vector units 211 and 221. Each vector unit includes at least a vector multiply unit and a vector adder unit. For example, vector unit 211 includes vector multiply unit 213 and vector adder unit 215. And vector unit 221 includes vector multiply unit 223 and vector adder unit 225. In various embodiments, matrix processor unit 201 includes the number of vector units to match the number of elements in weight input vector 205. In various embodiments, matrix processor unit 201 is configured to receive two input matrices, each matrix a two-dimensional matrix via data input vector 203 and weight input vector 205, respectively, and output a matrix result to output vector 251. In some embodiments, matrix processor unit 201, data input vector 203, weight input vector 205, and output vector 251 are matrix processor unit 101, data input vector 103, weight input vector 105, and output vector 151, respectively, of FIG. 1. In some embodiments, vector units 211 and 221 are each one or vector units 111, 121, 131, or 141 of FIG. 1. In some embodiments, multiple matrix processor units such as matrix processor unit 201 may be utilized in parallel for increased performance. For example, one matrix processor unit can be used to process one slice of a large matrix and another matrix processor unit can be used to process a separate slice of the same matrix.

In some embodiments, data input vector 203 is used to load a vector operand into matrix processor unit 201. For example, data corresponding to at least a portion of a two-dimensional matrix can be read from memory and stored in data input vector 203 before being loaded into matrix processor unit 201. In various embodiments, the vector operand stored in data input vector 203 may be directed to any one of the vector units of matrix processor unit 201, such as vector multiply unit 213 or 223. For example, in some embodiments, matrix processor unit 201 includes 32 vector units. Over 32 cycles, 32 vector operands can be loaded into matrix processor unit 201 via data input vector 203. For each cycle, one vector operand is loaded into data input vector 203 and then loaded into one of the 32 vector units. After 32 cycles, all 32 vector units have received a data vector operand. Similarly, weight input vector 205 is used to load a second vector operand into matrix processor unit 201. For example, weight data corresponding to at least a portion of a two-dimensional weight matrix can be read from memory and stored in weight input vector 205 before being loaded into matrix processor unit 201. In various embodiments, the vector operand stored in weight input vector 205 may be directed to any one or all of the vector units of matrix processor unit 201, such as vector multiply unit 213 or 223. For example, the same vector operand can be broadcasted to all vector units of matrix processor unit 201. This allows the same weight data to be applied to each data vector operand. In some embodiments, data input vector 203 can be used to similarly broadcast a vector operand to all vector units.

In some embodiments, the number of cycles required to load a vector operand from memory via data input vector 203 and/or weight input vector 205 into matrix processor unit 201 is based on the utilization of the matrix processor unit. For example, to keep the matrix processor near full utilization, data arguments for the vector units are retrieved from memory and prepared over a time period (e.g., a certain number of cycles) that closely matches the compute utilization of the vector units. By matching the load and compute times, the matrix processor can be kept near full utilization. In some embodiments, data read times are reduced, for example, by increasing the bus speed, to better match the load and compute times. For example, in various embodiments, matrix processor unit 201 may take approximately eight clock cycles to complete a certain set of computations. (An example of a set of computations might include applying eight different weight input vectors to a set of data input vectors.) A read rate of one vector operand per cycle would require at least 32 cycles to load all vector units. Increasing the read rate by a factor of four allows all 32 vector operands to be loaded in approximately 8 cycles, matching the processing compute time of the matrix processor unit. In various embodiments, by matching the data read speed, for example, the data bus speed used to load vector operands, with matrix processor unit compute performance and workload, the overall efficiency and throughput of the matrix processor unit is significantly increased.

In some embodiments, data input vector 203 and/or weight input vector 205 includes shifting hardware (not shown) to shift the elements of the vector operands. For example, weight input vector 205 can be loaded with a vector operand that is used for a first iteration. During a second iteration, the vector operand is shifted by one or more positions (to the right or left) as appropriate. The newly shifted vector operand can be used for matrix computation. Once matrix computation is completed, the vector operand can be shifted again and the newly shifted vector operand can be used for the next iteration. In this manner, a new vector operand (determined by shifting the contents of the input vector) is applied during each iteration. For example, in some embodiments, the shifting logic is utilized on an unrolled matrix operand, such as an unrolled weight matrix, to align the unrolled matrix operand with appropriate elements from a second matrix operand, such as an unrolled data matrix.

In some embodiments, matrix processor unit 201 includes multiple vector units that each include a vector multiply and vector adder unit. Each vector multiply unit, such as vector multiply unit 213 or 223, is configured to multiply corresponding elements from data input vector 203 and weight input vector 205. In some embodiments, the result is a vector of multiplication results. For example, for two 32-byte input vectors, the result of a vector multiply unit is a vector of 32 multiplication results. The first element from data input vector 203 is multiplied with the first element of weight input vector 205. Similarly, the second element from data input vector 203 is multiplied with the second element of weight input vector 205. In various embodiments, corresponding elements from data input vector 203 and weight input vector 205 are multiplied in parallel. In various embodiments, the vector of multiplication results is passed to a vector adder unit of the vector unit. For example, vector multiply unit 213 passes its multiplication results to vector adder unit 215 and vector multiply unit 223 passes its multiplication results to vector adder unit 225.

In some embodiments, each vector adder unit, such as vector adder unit 215 or 225, is configured to compute the sum of the elements from an input vector. For example, the sum of each of the elements from a vector of multiplication results computed by vector multiply unit 213 is computed by vector adder unit 215. Similarly, the sum of each of the elements from a vector of multiplication results computed by vector multiply unit 223 is computed by vector adder unit 225. In some embodiments, the result of a vector adder unit is a dot product of the vectors used as input to the corresponding vector multiply unit. In various embodiments, each vector adder unit, such as vector adder unit 215 or 225, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple dot products in parallel, significantly improving the throughput of matrix and convolution operations.

In some embodiments, matrix processor unit 201 includes one or more accumulators, for example, to accumulate the results of each vector unit. In some embodiments, an accumulator is included as part of a vector unit or as part of matrix processor unit 201 as appropriate. The accumulator(s) can be used to sum the results computed across multiple iterations of the vector units. For example, the final result sum of one iteration of a vector unit can be stored in an accumulator and added to the final result sum of the next iteration of the vector unit. In some embodiments, the accumulator is a vector accumulator. For example, the accumulator may be sized based on the size of output vector 251. In various embodiments, once matrix processing is complete, the accumulator results may be pushed to output vector 251.

Figure 3:
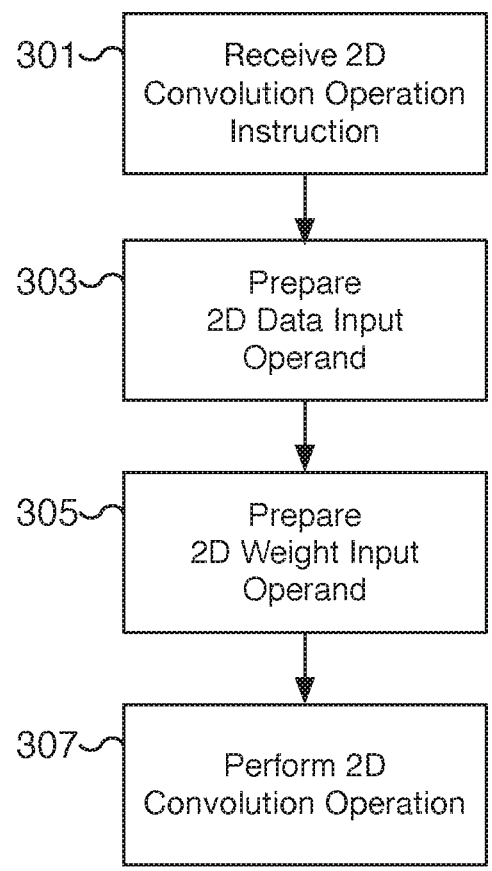
FIG. 3 is a flow chart illustrating an embodiment of a process for performing a two-dimensional convolution operation using a matrix processor unit.

FIG. 3 is a flow chart illustrating an embodiment of a process for performing a two-dimensional convolution operation using a matrix processor unit. For example, an artificial intelligence problem is solved using a neural network in part by analyzing one or more layers of a neural network by solving one or more two-dimensional convolution operations. The appropriate two-dimensional convolution operations may be initiated by issuing one or more two-dimensional convolution operation instructions to one or more matrix processor units. Each instruction may indicate two operand matrices, for example, by specifying the location of each matrix operand in memory, in a register, or in another appropriate location. In some embodiments, the instruction corresponds to a depthwise convolution using a data (or activation) matrix and a weight matrix. In some embodiments, the convolution operation is performed using matrix processor unit 101 of FIG. 1 and/or matrix processor unit 201 of FIG. 2.

At 301, a two-dimensional convolution operation instruction is received. For example, an instruction is received by a processor element such as a processor element that includes a matrix processor unit, input vector registers, an output vector register, local memory, a control logic unit, a transpose logic unit, and/or a data joiner unit, among others components. In various embodiments, the processor element may include additional or fewer components in addition to the matrix processor unit. The received two-dimensional convolution operation instruction directs the processor element to perform a two-dimensional convolution operation and specifies two matrix operands. For example, a first operand may be a two-dimensional data matrix and a second operand may be a weight matrix. In some embodiments, the matrix operands may be too large for loading into the matrix processor unit without first splitting one or more of the matrix operands into smaller matrix slices.

At 303, a two-dimensional data input operand is prepared. For example, a two-dimensional data matrix is prepared as an operand for a convolution operation. In some embodiments, data corresponding to the two-dimensional data input operand is retrieved from memory or another location. The retrieved data may be certain rows and/or columns of the data input operand. For example, different slices of the data input operand may be prepared separately and/or may be prepared in parallel by different processing elements. In various embodiments, the preparation may include unrolling portions of the two-dimensional data input operand. For example, the specified portions of the data input matrix may be linearized into a vector. In some embodiments, only a portion of the matrix or matrix slice is linearized, for example, only a subset of the rows. In unrolling and linearizing the selected portions of the matrix, the rows may be separated by padding elements, such as zero elements, to at least in part align the selected matrix elements with corresponding elements from the weight input operand. In various embodiments, the prepared data input operand is loaded into a vector unit of a matrix processor unit. Depending on the input operand, additional portions of the matrix are unrolled, linearized, and loaded into the matrix processor unit. For example, a vector corresponding to a different (and possibly overlapping) portion of the two-dimensional data input operand is unrolled, linearized, and loaded into each vector unit of the matrix processor unit. In some embodiments, the prepared data input operands are loaded via a data input vector such as data input vector 103 of FIG. 1 and/or data input vector 203 of FIG. 2.

At 305, a two-dimensional weight input operand is prepared. For example, a two-dimensional weight matrix is prepared as a second operand for a convolution operation. In some embodiments, data corresponding to the two-dimensional weight input operand is retrieved from memory or another location. The retrieved weight data may be certain rows and/or columns of the weight input operand. For example, different slices of the weight input operand may be prepared separately and/or may be prepared in parallel by different processing elements. In various embodiments, the preparation may include unrolling portions of the two-dimensional weight input operand. For example, the specified portions of the weight input matrix may be linearized into a vector. In some embodiments, only a portion of the matrix or matrix slice is linearized, for example, only a subset of the rows. In unrolling and linearizing the selected portions of the matrix, the rows may be separated by padding elements, such as zero elements, to at least in part align the selected matrix elements with corresponding elements from the data input operand. The number of padding elements may vary at least in part based on data sizes supported by the matrix processor unit and the dimensions of the weight input matrix. In various embodiments, the prepared weight input operand is loaded into a vector unit of a matrix processor unit. In some embodiments, the prepared weight input operand is broadcasted and loaded into more than one vector unit of the matrix processor unit. For example, the same weight input operand can be broadcasted to every vector unit of the matrix processor unit. In some embodiments, the prepared weight input operand is loaded via a weight input vector such as weight input vector 105 of FIG. 1 and/or weight input vector 205 of FIG. 2.

At 307, a two-dimensional convolution operation is performed. Using the data input operand and the weight input operand prepared at 303 and 305, respectively, a two-dimensional convolution operation is performed by a matrix processor unit. The convolution operation may include computing partial and/or intermediate results that are accumulated across different iterations. In various embodiments, the matrix processor unit provides a vector of output results as an output vector. In some embodiments, the output vector is stored in an output vector location such as output vector 151 of FIG. 1 and/or output vector 251 of FIG. 2. In some embodiments, the complete two-dimensional convolution operation may involve shifting the elements of the weight input operand to at least in part compute the depthwise convolution of the weight input matrix with different portions of the data input matrix.

Figure 4:
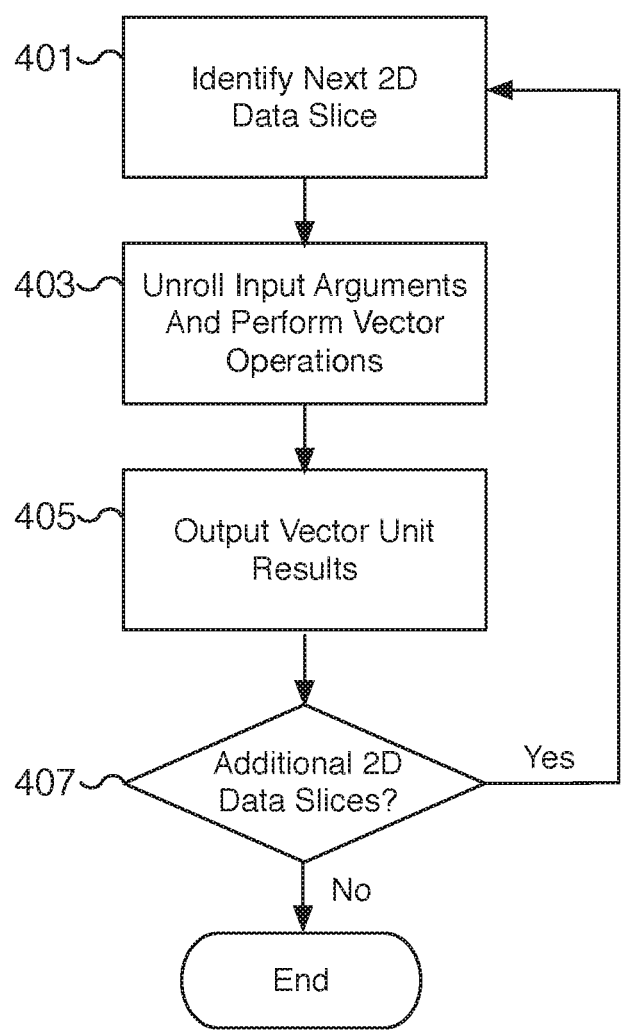
FIG. 4 is a flow chart illustrating an embodiment of a process for performing a two-dimensional convolution operation using a matrix processor unit.

FIG. 4 is a flow chart illustrating an embodiment of a process for performing a two-dimensional convolution operation using a matrix processor unit. For example, the result of a two-dimensional convolution operation is computed by performing multiple vector operations on two-dimensional slices of matrix arguments. One or more input arguments, such as a data input matrix, may exceed the maximum operand size of a matrix processor unit. As a result, an input operand may be sliced into smaller matrices compatible with the operand size of a matrix processor unit. The compatible-sized slices can be passed as operands to one or more different matrix processor units and the results combined. In some embodiments, the slices are operated on different matrix processor units, for example, matrix processor units corresponding to different processor elements. In various embodiments, the process of FIG. 4 may be performed in response to a convolution operation instruction such as the convolution operation instruction received at 301 of FIG. 3. In some embodiments, the process of FIG. 4 is performed at 303, 305, and/or 307 of FIG. 3. In some embodiments, the process of FIG. 4 is performed using matrix processor unit 101 of FIG. 1 and/or matrix processor unit 201 of FIG. 2.

At 401, the next two-dimensional slice of a matrix operand is identified. For example, one or more matrix operands with sizes compatible with the operand size of a matrix processor unit are identified. The slices may be identified in memory and a read request may be issued to load the identified data. In some embodiments, it may be common for the size of the data input matrix to be extremely large compared to the size of the weight input matrix. The data input matrix is sliced into smaller sizes for processing. At 401, the next slice is identified for processing.

At 403, the input arguments are unrolled and vector operations are performed. For example, a slice of a data input matrix and a weight input matrix are unrolled. In various embodiments, the unrolling linearizes a two-dimensional matrix (or matrix slice) into a vector operand that is loaded into at least one vector unit of a matrix processor unit. The unrolling may require more than one iteration. For example, in some embodiments, the unrolled matrix operand is unrolled over several iterations such that only a subset of rows is unrolled for each iteration. For example, for larger weight matrices, the weight matrix cannot be unrolled to fit in its entirety in a vector unit. Multiple iterations are utilized until the entire matrix is unrolled. In various embodiments, the weight matrix may be unrolled into a vector operand and broadcasted to more than one vector unit of the matrix processor unit. In some embodiments, each iteration may further include shifting the unrolled weight matrix to apply the elements of the weight matrix to different columns of the unrolled data matrix. In various embodiments, intermediate results may be accumulated and used as arguments for subsequent iterations. The vector operations performed can include a vector multiply and a vector add. For example, a dot product operation can be performed on vector data and weight arguments by each vector unit of a matrix processor unit to compute at least a portion of a depthwise convolution result.

At 405, the vector unit results are outputted. For example, each vector unit outputs a vector unit result to an element of an output vector such as output vector 151 of FIG. 1. In various embodiments, the vector unit results may be determined by accumulating multiple vector unit results over multiple iterations. In various embodiments, the vector unit results are outputted to an output vector for writing the results back to memory. In some embodiments, the vector unit results are portions of a depthwise convolution result.

At 407, a determination is made whether additional two-dimensional slices require processing. In the event additional two-dimensional slices remain to be processed, processing loops back to 401 to process the next slice. In the event no additional two-dimensional slices remain to be processed, processing ends.

Figure 5:
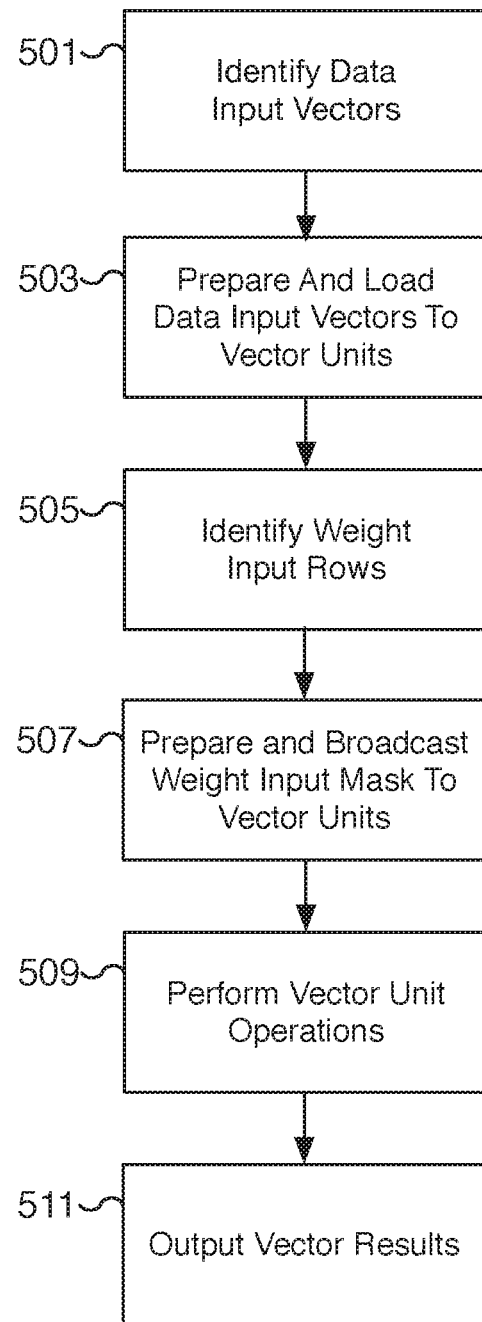
FIG. 5 is a flow chart illustrating an embodiment of a process for performing a two-dimensional convolution operation using a matrix processor unit and vector unit operations.

FIG. 5 is a flow chart illustrating an embodiment of a process for performing a two-dimensional convolution operation using a matrix processor unit and vector unit operations. For example, using the process of FIG. 5, input matrices are unrolled, linearized, and fed as input vectors to vector units of a matrix processor unit. Vector unit operations are performed to compute at least a partial result for the two-dimensional convolution operation. In various embodiments, a data input matrix and a weight input matrix are converted to input vectors. For example, a data slice may be identified from a data input matrix and converted to one or more data input vectors. In some embodiments, the process of FIG. 5 is performed at 403 and/or 405 of FIG. 4. In some embodiments, the process of FIG. 5 is performed using matrix processor unit 101 of FIG. 1 and/or matrix processor unit 201 of FIG. 2.

At 501, data input vectors are identified. For example, one or more data input vectors are identified from a slice of a data input matrix. In some embodiments, a data input vector is identified and prepared for each vector unit of a matrix processor unit. The data input vectors may include overlapping elements and correspond to selected elements used for performing a matrix operation, such as a two-dimensional convolution operation.

At 503, data input vectors are prepared and loaded to vector units. For example, elements corresponding to a subset of a data matrix are identified. In some embodiments, the data matrix may be a two-dimensional matrix slice of a larger data matrix. In various embodiments, the identified elements are a subset of the data matrix and selected based on a corresponding weight matrix and in particular the dimensions of the weight matrix and the number of rows that will be unrolled. For example, in some embodiments, an entire weight matrix can be unrolled and linearized to fit into a vector unit operand. However, as the dimensions of the weight matrix increase relative to the size of operands supported by the vector unit, the weight matrix may be too large to be unrolled into a single input vector and instead the weight matrix and corresponding data matrix are unrolled across multiple iterations.

In various embodiments, a weight matrix is either fully unrolled in one iteration or can be partially unrolled across multiple iterations. Whether a matrix is fully or partially unrolled can depend on the dimensions of the matrix arguments, in particular the weight matrix, relative to the size of the supported input vectors for the matrix processor unit. For example, in a scenario with a 3×3 weight matrix and support for a 32-element input vector, all nine elements (corresponding to three rows) of the weight matrix can be unrolled into a single 32-element weight input vector. As part of preparing a corresponding data input vector, elements from columns corresponding to three rows of the data matrix are selected. The selected elements from three rows are unrolled into a one-dimensional vector. The number of columns utilized may be based on the size of the data input vector. In the example scenario with a 32-element data input vector, three rows are identified and 10 elements (corresponding to 10 columns) for each row are selected. A total of 30 elements are selected from three rows and ten columns. The remaining two locations in the data input vector for two elements are insufficient to fit an entire column from the identified three rows and instead are padded, for example, with two zero-value elements. In this manner, a 3×10 portion of a data matrix can be unrolled and linearized into a data input vector and padded with two zero-value elements. Once prepared, the data input vector is loaded to an appropriate vector unit of the matrix processor unit. In various embodiments, each vector unit of the matrix processor unit is loaded with a prepared data input vector. For example, each vector unit of the matrix processor unit can be loaded by selecting elements starting with a different row.

In some embodiments, the initial number of columns to select from for preparing a data input vector is determined by dividing the size of the data input vector by the number of rows being unrolled. For example, in the event two, three, or four rows are being unrolled, a 32-element data input vector can be loaded with elements from sixteen, ten, or eight columns, respectively. Any unused elements of the data input vector can be filled with zero-value elements as padding. Once the number of columns is determined, each iteration can utilize the same number of columns. For example, a 7×7 matrix can be loaded into a 32-element data input vector over four iterations. For the first three iterations, two rows (i.e., rows 1-2, 3-4, and 5-6) are unrolled each iteration and the last row (i.e., row 7) is unrolled for the fourth iteration. Each iteration can select 16 elements from different columns for the corresponding selected rows. The last iteration has additional padding since only one row is being unrolled. In various embodiments, zero-value elements are used as padding elements. A padding element with a value of zero allows the vector unit to perform multiply and addition vector operations with no impact on a resulting vector sum or dot product result.

In various embodiments, once properly prepared using the appropriate format, a data input vector is loaded into a corresponding vector unit of the matrix processor unit. In some embodiments, a data input vector is prepared and loaded into each of the vector units of the matrix processor unit. For example, the data input vector prepared for each vector unit can correspond to a sub-matrix of the data input matrix with each sub-matrix starting at a different row of the data input matrix. For example, in the event the weight matrix is a fully unrolled 3×3 matrix, the first vector unit may correspond to a sub-matrix with elements from rows 1-3, the second vector unit may correspond to a sub-matrix with elements from rows 2-4, the third vector unit may correspond to a sub-matrix with elements from rows 3-5, and so forth. In an embodiment, with 32 vector units, the 32nd vector unit may correspond to a sub-matrix with elements from rows 32-34.

At 505, weight input rows are identified. For example, one or more rows from a weight input matrix are identified for performing vector unit operations. In some embodiments, a weight input matrix is fully unrolled and each row of the weight input matrix is identified for unrolling. In various embodiments, a weight input matrix may be too large for full unrolling and is only partially unrolled. Only the rows selected for unrolling are identified for further processing at 507. For example, a 3×3 weight matrix (with 9 elements) can be fully unrolled into a 32-element weight input vector so each row of the weight matrix is utilized. As another example, a 7×7 weight matrix (with 49 elements) cannot be fully unrolled into a 32-element weight input vector. Only the unrolled rows are identified for the current iteration. In various embodiments, successive iterations are used to identify the remaining rows.

At 507, a weight input mask is prepared and broadcasted to the vector units. For example, elements corresponding to the weight input rows identified at 505 are prepared into a weight input mask. The weight input mask is linearized as a one-dimensional input vector for the vector units of the matrix processor unit. In various embodiments, the linearized weight elements are formatted with padding to align the start of each weight input row with an associated data input row prepared at 503. For example, using a 32-element vector and a 3×3 weight matrix with all rows identified at 505, all nine elements of the weight matrix are selected. The nine elements of the weight matrix are formatted into a weight input mask using an additional 23 padding elements. In some embodiments, 30 elements are used for the three rows of the selected 3×3 matrix. Each row includes three elements from a row followed by seven padding elements. The remaining elements of a data input vector not used for the rows of the selected 3×3 matrix, in this example, two elements, are filled with additional padding elements. In various embodiments, zero-value elements are used as padding elements. A padding element with a value of zero allows the vector unit to perform multiply and addition vector operations with no impact on a resulting vector sum.

In various embodiments, the formatted weight input mask is an input vector that is broadcasted to each vector unit of a matrix processor unit. For example, a weight input vector is used to store the prepared weight input mask in a linearized one-dimensional vector format. The weight input mask is then broadcasted to each appropriate vector unit as an input vector operand. For example, a single weight input mask can be prepared and utilized by all the vector units of a matrix processor unit. In some embodiments, the row padding elements are utilized to allow the weight input mask to be shifted to realign the elements of the weight matrix with different columns of a data matrix as referenced in a data input vector.

At 509, vector unit operations are performed. Utilizing the input vectors loaded from data input vectors and the broadcasted weight input mask, the corresponding vector units of a matrix processor unit perform vector unit operations. In some embodiments, the vector unit operations include vector multiply and addition operations. For example, each element from a data input vector is multiplied by its corresponding element from the weight input mask. The result is a vector of multiplication results. In some embodiments, the vector multiplication operation is performed by a vector multiply unit of a vector unit. Using the vector multiply result, a vector sum result is calculated by adding each of the elements from the vector of multiplication results. In some embodiments, the sum is determined using a vector adder unit of the vector unit. For example, a vector adder unit using an adder tree can compute the sum of the vector elements. In some embodiments, the matrix processor unit includes an accumulator for adding the vector adder result with previous vector adder results. For example, intermediate or partial results from each iteration can be accumulated to determine a running accumulated sum using an accumulator. The accumulated sum allows the vector sum result from one iteration (or pass) to be added into the result of a subsequent iteration (or pass). In various embodiments, the zero-padded elements prepared for the weight input mask (and/or data input vector) result in a zero multiplication result and have no impact on the vector addition result. In some embodiments, each vector unit of a matrix processor unit performs a dot product operation using its corresponding loaded data input vector and the broadcasted weight input mask. The dot product result may be accumulated with the results from previous iterations (or passes) and/or stored to be added to the results of future iterations.

At 511, vector results are outputted. For example, the vector result determined by performing vector unit operations at 509 is outputted from the matrix processor unit. In some embodiments, the vector results are outputted to an output vector result that is used to write the output to memory. In some embodiments, the results are outputted and used as an argument to a subsequent matrix operation.

Figure 6:
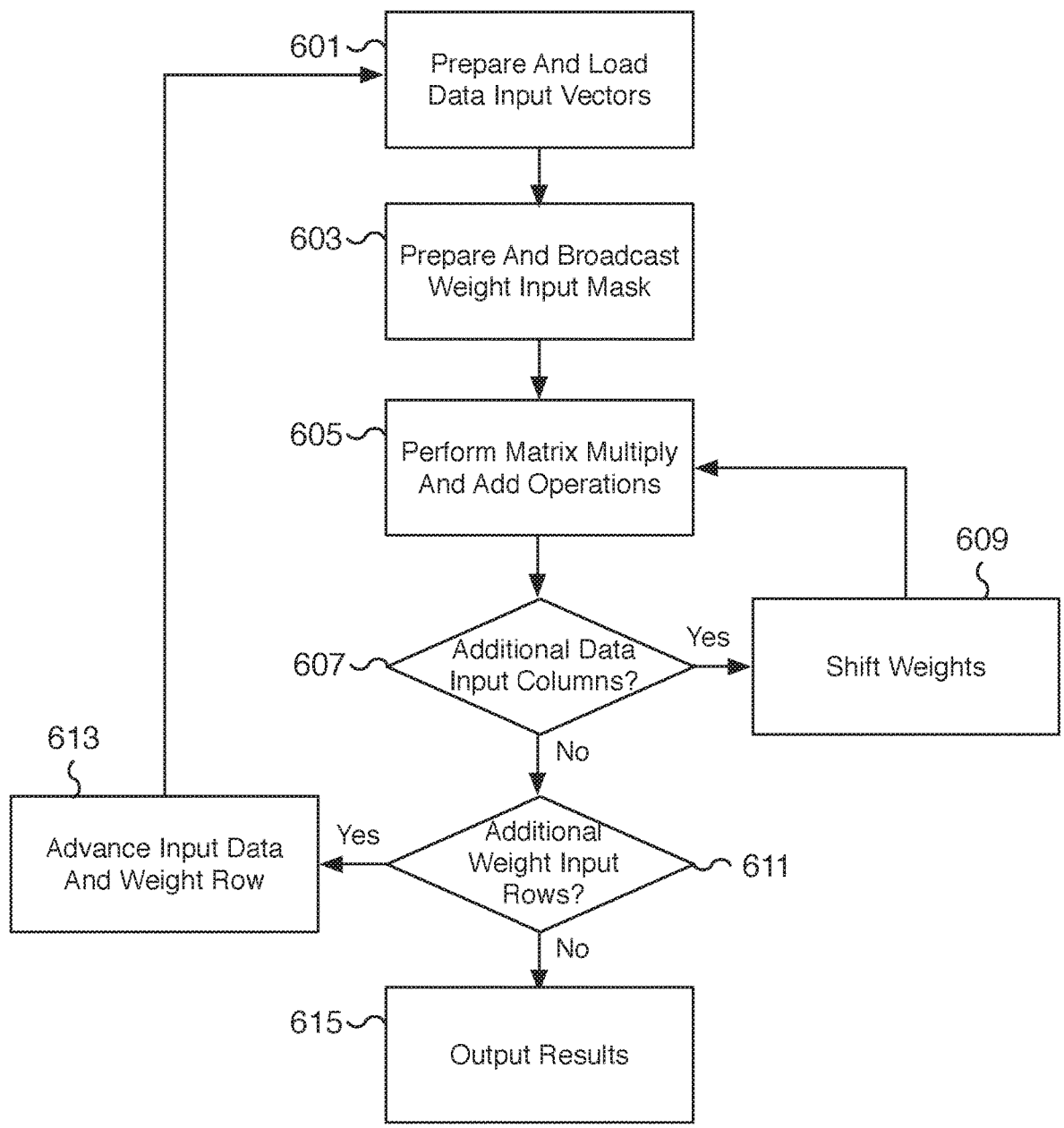
FIG. 6 is a flow chart illustrating an embodiment of a process for performing a two-dimensional convolution operation using a matrix processor unit and vector unit operations.

FIG. 6 is a flow chart illustrating an embodiment of a process for performing a two-dimensional convolution operation using a matrix processor unit and vector unit operations. For example, using a data input matrix and a data weight matrix, matrix multiply and add operations are performed to compute at least a partial result for the two-dimensional convolution operation. The input matrices are unrolled, linearized, and fed as input vectors to vector units of a matrix processor unit. Weight input matrices that do not fit the size of an input vector are partially unrolled across different iterations. To further increase the throughput and efficiency of the matrix computations, additional passes are performed by shifting the unrolled input weight mask to realign the elements of the weight mask with different elements (and corresponding columns) of loaded data input vectors. By reusing prepared data input vectors with realigned weight masks, the impact on performance related to data transfers, especially from loading elements from a data input matrix to the matrix processor unit, is significantly reduced. For example, multiple passes are performed on each data input vector for each iteration of an input weight mask by only modifying the input weight mask while keeping the loaded data input vectors unchanged. In some embodiments, the process of FIG. 6 is performed using the process of FIG. 5. For example, in some embodiments, the steps 605, 607, and/or 609 may be performed at 509 of FIG. 5. In some embodiments, the process of FIG. 6 is performed using matrix processor unit 101 of FIG. 1 and/or matrix processor unit 201 of FIG. 2.

At 601, data input vectors are prepared and loaded into a matrix processor unit. In some embodiments, the data input vectors are prepared and loaded as described with respect to steps 501 and 503 of FIG. 5. For example, the data input vectors are loaded to be compatible with the corresponding rows of a weight input vector. In some embodiments, the data input vectors include padding elements such as zero-value elements to prevent loading partial columns of elements. As an example, using a 3×3 weight input matrix and a 32-element data input vector, a fully unrolled weight input matrix references three rows. Correspondingly, three rows of data elements are loaded into a data input vector. The number of three-row columns depends on the available number of elements from the data input vector. In the example, ten three-row columns are loaded for a total of 30 elements. The two remaining elements of the data input vector are unused and may be zeroed out with zero-value elements. The next data input vector can be loaded starting with the next corresponding row from the data matrix. In this manner, data input vectors from different (but possibly overlapping) slices of a data matrix are loaded into each vector unit of the matrix processor unit. As another example, using a 7×7 weight input matrix and a 32-element data input vector, a partially unrolled weight input matrix references two rows for each of the first three iterations and a single final row for the fourth iteration. Correspondingly, two rows of data elements are loaded into a data input vector for the iterations with two weight rows and one row of data elements is loaded into a data input vector for the final iteration using the last (and seventh) weight row. The number of two-row columns depends on the available number of elements from the data input vector. In the example, sixteen two-row columns are loaded for a total of 32 elements for the first three iterations with no padding elements needed. For the fourth iteration, sixteen elements from a single row are loaded and the sixteen remaining elements of the data input vector are unused and may be zeroed out with zero-value elements. Similar to the 3×3 weight matrix example, within each iteration, the next data input vector can be loaded starting with the next corresponding row from the data matrix. In the 7×7 weight input matrix example, data input vectors from different (but possibly overlapping) slices of a data matrix are loaded into each vector unit of the matrix processor unit either two rows (for the first three iterations) or one row (for the final and fourth iteration) at a time.

At 603, a weight input mask is prepared and broadcasted to one or more vector units of the matrix processor unit. In some embodiments, the weight input mask is prepared and broadcasted as described with respect to steps 505 and 507 of FIG. 5. For example, for a fully unrolled weight matrix, each row of the weight matrix is unrolled and linearized into an input vector. To improve the efficiency of the matrix operations, zero padded elements are used to evenly space out the rows of the weight matrix within the input vector. As described above, the zero-padded elements allow the weight input vector to act as a weight input mask. Shifting the weight elements realigns the weight input mask to associate the weight elements with different corresponding columns from the data matrix. In some scenarios, the weight mask is padded to account for incomplete corresponding data columns. Once loaded into a weight input vector, the weight input mask is broadcasted to one or more applicable vector units of the matrix processor unit.

In some embodiments, a weight matrix is only partially unrolled. Over multiple iterations, all the rows of the weight matrix are unrolled. For a particular iteration, the selected rows are unrolled and padded with zero-value elements to create a partial weight mask associated with the selected rows. Subsequent iterations (or iterations performed in parallel) are used to unroll the remaining weight rows. For example, a 7×7 weight matrix (with 49 elements) cannot be fully unrolled into a 32-element weight input vector. Only the unrolled rows are identified for the current iteration. If at most two rows are unrolled, then four iterations are needed to fully unroll a 7×7 weight matrix. In some embodiments, different numbers of rows are selected for partial unrolling. For example, two, three, or more rows may be selected for unrolling as appropriate based on the weight matrix dimensions and the vector argument size of a vector unit.

At 605, matrix multiply and add operations are performed. In some embodiments, the matrix operations are described with respect to step 509 of FIG. 5. Utilizing the input vectors loaded from data input vectors and the broadcasted weight input mask, the corresponding vector units of a matrix processor unit perform vector unit operations including vector multiply and add operations. Each vector unit may perform a vector matrix multiply using the data input vector and the weight input mask. Unmasked elements result in multiplying the weight matrix elements against data matrix elements while masked out elements result in a zero value result. In various embodiments, the multiplication results are added using a vector adder to compute a resulting sum. For example, a 32-element vector unit receives two 32-element input vectors (a data input vector and a weight input mask) and performs a vector multiply to compute 32 multiplication results. A vector add operation is performed to add all 32 multiplication results to compute a single result sum. In some embodiments, the resulting sum is an intermediate result and is added to a previously computed result sum. For example, an accumulator may be used to store the resulting sum and on successive iterations the intermediate result is added to the currently computed result sum to keep a running sum across multiple iterations.

In some embodiments, each vector unit performs its vector operations in parallel. For example, a matrix processor unit with 32 vector units can compute 32 results corresponding to 32 result sums. In various embodiments, each vector unit of a matrix processor unit performs a dot product operation using its corresponding loaded data input vector and the broadcasted weight input mask. The dot product result may be accumulated with the results from previous iterations (or passes) and/or stored to be added to the results of future iterations.

At 607, a determination is made whether additional columns of the data input matrix remain to be processed. In the event additional columns of the data input matrix remain to be processed, processing proceeds to 609. In the event no additional columns of the data input matrix remain to be processed, processing proceeds to 611.

At 609, the weights corresponding to the weight input vector are shifted. For example, the elements of a vector input mask are shifted to realign the weight elements with different data elements from data input vectors. For example, existing data input vectors loaded at 601 are used in an additional pass with a new weight input vector. The new weight input vector is prepared by shifting the weight elements, for example, by shifting each weight element to the right by one element. The shift realigns the weight elements with data elements corresponding to the next column. For example, a weight input mask corresponding to a 3×3 weight matrix may be loaded into a vector unit along with a data input vector corresponding to a 3×10 slice of the data matrix. Shifting the weight elements effectively slides the weight input mask to associate the weight matrix with a different three columns from the 3×10 slice. With a 3×3 weight matrix, eight passes (corresponding to seven shifts) can be performed before reaching the end of the data slice. As another example, using a 7×7 weight matrix with two unrolled weight rows, each data input vector references 16 columns. Ten passes (corresponding to nine shifts) can be performed before reaching the end of the data slice. By spacing out the weight elements with padding elements in the weight input vector, the number of padding elements determines the maximum number of shifts (and passes) that can be performed with the loaded data input vectors.

In various embodiments, once the weight input vector is shifted, the newly prepared weight input vector is broadcasted to each applicable vector unit. Processing proceeds to 605 where matrix operations are performed using a realigned weight input mask and a previously loaded data input vector.

At 611, a determination is made whether additional rows of the weight input matrix remain to be processed. In the event additional rows of the weight input matrix remain to be processed, processing proceeds to 613. For example, partially unrolled matrices may have additional rows that need to be unrolled and processed. In contrast, a fully unrolled weight matrix will not have additional weight rows for processing. In the event no additional rows of the weight input matrix remain to be processed, processing proceeds to 615.

At 613, data input and weight rows are advanced. For example, for a partially unrolled weight (and corresponding data) matrix, the identified rows are advanced to select the next set of rows for unrolling. Both the weight and data matrices are advanced together in order to associate the correct weight and data elements together. Using a 7×7 weight matrix as an example and unrolling at most two rows each iteration, the first iteration selects rows 1 and 2. At 611, additional weight input rows remain to be processed so at step 613, the selected rows are advanced to select rows 3 and 4. A subsequent iteration selects rows 5 and 6. A final iteration selects row 7. Processing then proceeds to 601.

At 615, results are outputted. In some embodiments, the results are outputted as described with respect to step 511 of FIG. 5. For example, the vector result determined by performing the matrix multiply and add operations at 605 is outputted from the matrix processor unit. In some embodiments, the vector results are outputted to an output vector result that is used to write the output to memory. In some embodiments, the results are outputted and used as an argument to a subsequent matrix operation.

Figure 7A:
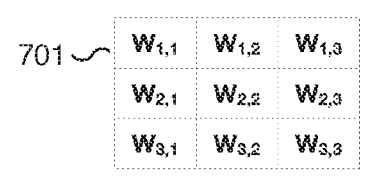

FIGS. 7A and 7B are diagrams illustrating example matrix operands for performing depthwise convolution. In FIG. 7A, weight matrix 701 represents an exemplar 3×3 matrix of weight elements. Other dimensions for a weight matrix may be appropriate as well, such as 1×1, 5×5, 7×7, 9×9, etc. In the example shown, the subscripts associated with each weight element use a row and column notation. For the first row of weight matrix 701, $W_{1,1}$ is the weight element located at column 1, $W_{1,2}$ is the weight element located at column 2, and $W_{1,3}$ is the weight element located at column 3. In FIG. 7B, data matrix 703 represents an exemplar data matrix of data elements. The dimensions of data matrix 703 are larger than weight matrix 701. In the example of FIG. 7B, only rows 1-4 and 32-34 of data matrix 703 are shown. The width of data matrix 703 can extend past 11 columns. Similarly, the height of data matrix 703 can extend past 34 rows (not shown). In FIG. 7B, data matrix 703 is shown with 34 rows to make it compatible with 3×3 weight matrix 701 and a matrix processor unit with 32 vector units. In some embodiments, weight matrix 701 and data matrix 703 are input matrices for performing convolution operations using the techniques described herein. In some embodiments, the convolution operations, such as a depthwise convolution, are performed on weight matrix 701 and data matrix 703 using matrix processor unit 101 of FIG. 1 and/or matrix processor unit 201 of FIG. 2 and/or the processes of FIGS. 3-6. For example, the convolution operation instruction received at 301 of FIG. 3 may specify a weight matrix such as weight matrix 701 and a data matrix such as data matrix 703.

FIGS. 8A and 8B are diagrams illustrating an example of an unrolled data matrix for performing depthwise convolution. FIGS. 8A and 8B include index labels 801 and 802 that indicate the location of a data element in a 32-element data input vector. FIGS. 8A and 8B include seven example data input vectors 803/804, 805/806, 807/808, 809/810, 811/812, 813/814, and 815/816. The first half of each data input vector is shown in FIG. 8A and the corresponding second half of each input vector is shown in FIG. 8B. Due to the large size of the vectors, for ease of illustration, the data input vectors are illustrated as vector pairs and split across FIGS. 8A and 8B. For example, the seven 32-element data input vectors include 16-element vector pairs 803/804, 805/806, 807/808, 809/810, 811/812, 813/814, and 815/816.

In some embodiments, the data input vectors shown in FIGS. 8A and 8B are data input vectors unrolled from data matrix 703 of FIG. 7B. For example, data input vector 803/804 corresponds to elements from the first three rows of data matrix 703 of FIG. 7B unrolled into a 1-dimensional vector and includes data elements from rows 1-3 and columns 1-10 of data matrix 703. Similarly, referencing elements from columns 1-10 of data matrix 703 of FIG. 7B, data input vector 805/806 corresponds to elements from rows 2-4, data input vector 807/808 corresponds to elements from rows 3-5, data input vector 809/810 corresponds to elements from rows 4-6, data input vector 811/812 corresponds to elements from rows 5-7, data input vector 813/814 corresponds to elements from rows 6-8, and data input vector 815/816 corresponds to elements from rows 32-34. Data elements associated with different 3×10 slices of data matrix 703 of FIG. 7B are loaded into each of data input vectors 803/804, 805/806, 807/808, 809/810, 811/812, 813/814, and 815/816. Elements at locations 30 and 31 (the 31st and 32nd elements) of each of data input vectors 803/804, 805/806, 807/808, 809/810, 811/812, 813/814, and 815/816 are zero-value elements. In various embodiments, elements at locations 30 and 31 are padding elements.

In some embodiments, each of the data input vectors of FIGS. 8A and 8B are loaded into separate vector units of a matrix processor unit. For a matrix processor unit with 32 vector units, 32 data input vectors are loaded and each may be prepared by starting with a different row. In the example shown, data input vectors 803/804, 805/806, 807/808, 809/810, 811/812, and 813/814 are loaded into the first six vector units and data input vector 815/816 is loaded into the 32nd vector unit. Although not shown, vector units 7-31 are loaded with corresponding data input vectors. In some embodiments, data input vectors 803/804, 805/806, 807/808, 809/810, 811/812, 813/814, and 815/816 are loaded into a matrix processor unit, such as matrix processor unit 101 of FIG. 1, via a data input vector such as data input vector 103 of FIG. 1. In some embodiments, the unrolling process to create data input vectors 803/804, 805/806, 807/808, 809/810, 811/812, 813/814, and 815/816 is performed at 303 of FIG. 3, at 401 and/or 403 of FIG. 4, at 501 and/or 503 of FIG. 5, and/or at 601 of FIG. 6. In some embodiments, the data input vectors of FIGS. 8A and 8B represent a partial set of data input vectors prepared for one iteration of an unrolling process and are formatted to be aligned with a fully unrolled 3×3 weight matrix such as weight matrix 701 of FIG. 7A.

FIGS. 9A and 9B are diagrams illustrating an example of an unrolled weight matrix for performing depthwise convolution. FIGS. 9A and 9B include index labels 901 and 902 that indicate the location of a weight element in a 32-element weight input vector. FIGS. 9A and 9B include eight example weight input vectors 903/904, 905/906, 907/908, 909/910, 911/912, 913/914, 915/916, and 917/918. The first half of each weight input vector is shown in FIG. 9A and the corresponding second half of each input vector is shown in FIG. 9B. Due to the large size of the vectors, for ease of illustration, the weight input vectors are illustrated as vector pairs and split across FIGS. 9A and 9B. For example, the eight 32-element weight input vectors include 16-element vector pairs 903/904, 905/906, 907/908, 909/910, 911/912, 913/914, 915/916, and 917/918. The weight input vectors represent eight different weight input vectors that are broadcasted to the vector units of a matrix processor unit over eight passes. Examples of corresponding data input vectors are shown in FIGS. 8A and 8B and may remain unchanged for the entire eight passes as the weight input vectors change.

In some embodiments, the weight input vectors shown in FIGS. 9A and 9B are weight input vectors unrolled from weight matrix 701 of FIG. 7A. For example, each of weight input vectors 903/904, 905/906, 907/908, 909/910, 911/912, 913/914, 915/916, and 917/918 corresponds to elements from weight matrix 701 of FIG. 7A unrolled into and spaced out over a 1-dimensional vector. The weight elements and rows are prepared at different locations to align the weight input vector with different columns of a corresponding data input vector. Zero-value padded elements are included between the rows and at the end of the vectors at locations 30 and 31. For example, weight input vector 903/904 includes row 1 of weight matrix 701 of FIG. 7A at element locations 0-2, row 2 at element locations 10-12, and row 3 at element locations 20-22. Weight input vector 905/906 may be prepared by shifting the elements of weight input vector 903/904 to the right by one location. Similarly, weight input vectors 907/908, 909/910, 911/912, 913/914, 915/916, and 917/918 are created by shifting the elements of weight input vectors 905/906, 907/908, 909/910, 911/912, 913/914, and 915/916, respectively. In some embodiments, as the weight input vectors are shifted to the right, zero-value padding elements are introduced to the front of the weight input vectors.

In some embodiments, each of the weight input vectors of FIGS. 9A and 9B is broadcasted into the vector units of a matrix processor unit at a different pass of the corresponding data input vectors. For a matrix processor unit with 32 vector units, 32 weight input vectors are loaded with the same weight input vector for each pass. For example, weight input vector 903/904 is broadcasted to each vector unit for pass one, weight input vector 905/906 is broadcasted to each vector unit for pass two, weight input vector 907/908 is broadcasted to each vector unit for pass three, and so forth, until weight input vector 917/918 is broadcasted to each vector unit for the eighth pass.

In some embodiments, weight input vectors 903/904, 905/906, 907/908, 909/910, 911/912, 913/914, 915/916, and 917/918 are loaded into a matrix processor unit, such as matrix processor unit 101 of FIG. 1, via a weight input vector such as weight input vector 105 of FIG. 1. In some embodiments, the unrolling process to create weight input vectors 903/904, 905/906, 907/908, 909/910, 911/912, 913/914, 915/916, and 917/918 is performed at 305 of FIG. 3, at 401 and/or 403 of FIG. 4, at 505 and/or 507 of FIG. 5, and/or at 603, 607, and/or 609 of FIG. 6. In some embodiments, the different weight input vectors of FIGS. 9A and 9B represent different weight input masks prepared for one iteration of an unrolling process that includes eight passes. Each of the weight input masks is a fully unrolled 3×3 weight matrix such as weight matrix 701 of FIG. 7A and is formatted to be aligned with different 3×3 slices of a data matrix, such as data matrix 703 of FIG. 7B.

FIGS. 10A and 10B are diagrams illustrating an example of vector computations for performing depthwise convolution. FIGS. 10A and 10B include index labels 1001 and 1002 that indicate the location of weight and data elements in 32-element weight input vector 1003/1004 and data input vector 1005/1006, respectively. In some embodiments, weight input vector 1003/1004 is weight input vector 903/904 of FIGS. 9A and 9B and data input vector 1005/1006 is data input vector 803/804 of FIGS. 8A and 8B. In some embodiments, weight input vector 1003/1004 and data input vector 1005/1006 are examples of two input vectors loaded into a vector unit for performing vector operations. In various embodiments, each of the vector units of a matrix processor unit is loaded with a corresponding pair of input vectors.

In some embodiments, cell 1011 illustrates the equivalent vector computations performed by a vector unit of a matrix processor unit on input vectors of weight input vector 1003/1004 and data input vector 1005/1006. The vector computation result shown in cell 1011 is the result determined by multiplying each element of weight input vector 1003/1004 against a corresponding element of data input vector 1005/1006. The 32-elements from weight input vector 1003/1004 are multiplied against 32 elements of data input vector 1005/1006 to determine 32 multiplication results. In the example shown, cell 1011 includes only nine multiplication terms instead of 32. The nine multiplication terms correspond to the nine weight elements from weight input vector 1003/1004 and their corresponding data elements from data input vector 1005/1006. The zero-value elements of weight input vector 1003/1004 function as a weight mask that results in reducing the number of multiplication terms to nine from a possible 32. In some embodiments, the multiplication is performed using a vector multiply unit such as vector multiply unit 213 or 223 of FIG. 2. In some embodiments, the multiplication results are fed as a vector into a vector adder unit to compute the sum of the multiplication results. The vector sum may be performed using a vector adder unit such as vector adder unit 215 or 225 of FIG. 2. In the example shown, the result of the vector operations performed is a single result sum. In some embodiments, the result sum is a partial or intermediate result sum and may be stored in an accumulator. In some embodiments, the result sum is a dot product computed using weight input vector 1003/1004 and data input vector 1005/1006. The result sum may be outputted as one element of a vector result and written to an output vector such as output vector 151 of FIG. 1. In some embodiments, the equivalent of the vector computation result shown in cell 1011 is performed using matrix processor unit 101 of FIG. 1 and/or the processes of FIGS. 3-6. In some embodiments, the vector computations are performed at 307 of FIG. 3, at 403 of FIG. 4, at 509 of FIG. 5, and/or at 605 of FIG. 6.

Figure 11B:
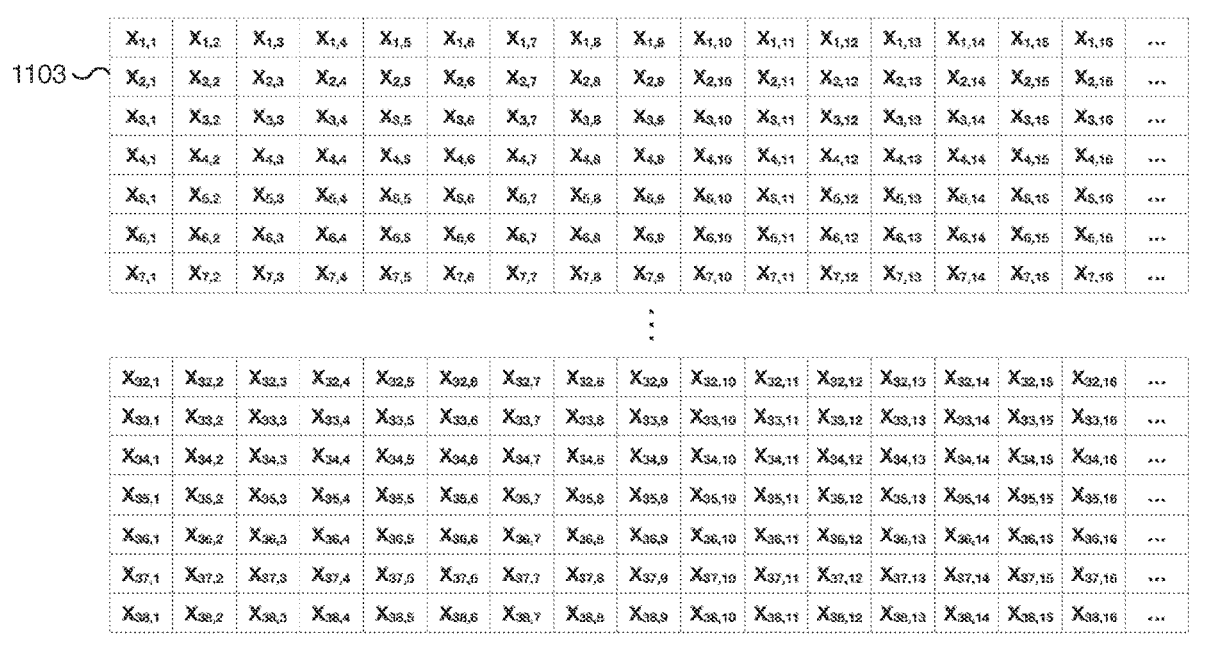

FIGS. 11A and 11B are diagrams illustrating example matrix operands for performing depthwise convolution. In FIG. 11A, weight matrix 1101 represents an exemplar 7×7 matrix of weight elements. As described with respect to FIGS. 7A and 7B, in the example shown, the subscripts associated with each weight element use a row and column notation. In FIG. 11B, data matrix 1103 represents an exemplar data matrix of data elements. The dimensions of data matrix 1103 are larger than weight matrix 1101. In the example of FIG. 11B, only rows 1-7 and 32-38 of data matrix 1103 are shown. The width of data matrix 1103 can extend past 16 columns. Similarly, the height of data matrix 1103 can extend past 38 rows (not shown). In FIG. 11B, data matrix 1103 is shown with 38 rows to make it compatible with 7×7 weight matrix 1101 and a matrix processor unit with 32 vector units. In some embodiments, weight matrix 1101 and data matrix 1103 are input matrices for performing convolution operations using the techniques described herein. In some embodiments, the convolution operations, such as a depthwise convolution is performed on weight matrix 1101 and data matrix 1103 using matrix processor unit 101 of FIG. 1 and/or matrix processor unit 201 of FIG. 2 and/or the processes of FIGS. 3-6. For example, the convolution operation instruction received at 301 of FIG. 3 may specify a weight matrix such as weight matrix 1101 and a data matrix such as data matrix 1103.

FIGS. 12A and 12B are diagrams illustrating an example of a partially unrolled data matrix for performing depthwise convolution. FIGS. 12A and 12B include index labels 1201 and 1202 that indicate the location of a data element in a 32-element data input vector. FIGS. 12A and 12B include four example data input vectors 1203/1204, 1205/1206, 1207/1208, and 1209/1210. The first half of each data input vector is shown in FIG. 12A and the corresponding second half of each input vector is shown in FIG. 12B. Due to the large size of the vectors, for ease of illustration, the data input vectors are illustrated as vector pairs and split across FIGS. 12A and 12B. For example, the four 32-element data input vectors include 16-element vector pairs 1203/1204, 1205/1206, 1207/1208, and 1209/1210.

In some embodiments, the data input vectors shown in FIGS. 12A and 12B are data input vectors partially unrolled from data matrix 1103 of FIG. 11B. The data input vectors of FIGS. 12A and 12B are partially unrolled since none of the data input vectors contains an entire 7×7 matrix slice of data matrix 1103 of FIG. 11B to correspond with a 7×7 weight matrix. For example, data input vector 1203/1204 corresponds to elements from only the first two rows of data matrix 1103 of FIG. 11B unrolled into a 1-dimensional vector. Data input vector 1203/1204 includes data elements from rows 1-2 and columns 1-16 of data matrix 1103. Similarly, referencing elements from columns 1-16 of data matrix 1103 of FIG. 11B, data input vector 1205/1206 corresponds to elements from rows 3 and 4, data input vector 1207/1208 corresponds to elements from rows 5 and 6, and data input vector 1209/1210 corresponds to elements from row 7. Data elements associated with different 2×16 slices of data matrix 1103 of FIG. 11B are loaded into each of data input vectors 1203/1204, 1205/1206, 1207/1208, and 1209/1210. For data input vector 1209/1210, elements at locations 16-31 (the last 16 elements) are zero-value elements. In various embodiments, the zero-value elements are padding elements.

In some embodiments, each of the data input vectors of FIGS. 12A and 12B are loaded into a vector unit of a matrix processor unit during a different iteration. Since at most two rows of a 7×7 data slice are represented in each data input vector, all four data input vectors 1203/1204, 1205/1206, 1207/1208, and 1209/1210 are needed to compute a 7×7 matrix operation using a 7×7 weight matrix. In total, four iterations may be performed, one for each data input vector. For example, data input vector 1203/1204 is loaded to a vector unit for iteration one, data input vector 1205/1206 is loaded to a vector unit for iteration two, data input vector 1207/1208 is loaded to a vector unit for iteration three, and data input vector 1209/1210 is loaded to a vector unit for the fourth iteration. In the example shown, only a single data input vector for each iteration is shown. For a matrix processor unit with 32 vector units, during each iteration, 32 different data input vectors (of which only one is shown) are loaded and each may be prepared by starting with a different row. In some embodiments, data input vectors 1203/1204, 1205/1206, 1207/1208, and 1209/1210 are loaded into a matrix processor unit, such as matrix processor unit 101 of FIG. 1, via a data input vector such as data input vector 103 of FIG. 1. In some embodiments, the unrolling process to create data input vectors 1203/1204, 1205/1206, 1207/1208, and 1209/1210 is performed at 303 of FIG. 3, at 401 and/or 403 of FIG. 4, at 501 and/or 503 of FIG. 5, and/or at 601, 611, and/or 613 of FIG. 6. In some embodiments, the data input vectors of FIGS. 12A and 12B represent a partial set of data input vectors prepared for a partial unrolling process taking four iterations and are formatted to be aligned with a partially unrolled 7×7 weight matrix such as weight matrix 1101 of FIG. 11A.

FIGS. 13A and 13B are diagrams illustrating an example of a partially unrolled weight matrix for performing depth-wise convolution. FIGS. 13A and 13B include index labels 1301 and 1302 that indicate the location of a weight element in a 32-element weight input vector. FIGS. 13A and 13B include ten example weight input vectors 1303/1304, 1305/1306, 1307/1308, 1309/1310, 1311/1312, 1313/1314, 1315/1316, 1317/1318, 1319/1320, and 1321/1322. The first half of each weight input vector is shown in FIG. 13A and the corresponding second half of each input vector is shown in FIG. 13B. Due to the large size of the vectors, for ease of illustration, the weight input vectors are illustrated as vector pairs and split across FIGS. 13A and 13B. For example, the ten 32-element weight input vectors include 16-element vector pairs 1303/1304, 1305/1306, 1307/1308, 1309/1310, 1311/1312, 1313/1314, 1315/1316, 1317/1318, 1319/1320, and 1321/1322. The weight input vectors represent ten different weight input vectors that are broadcasted to the vector units of a matrix processor unit over ten passes. The weight input vectors of FIGS. 13A and 13B are associated with the first two rows of a weight matrix. In some embodiments, data input vector 1203/1204 of FIGS. 12A and 12B is an example of a corresponding data input vector associated with the corresponding first two rows of a corresponding data matrix. The vector units are loaded with data input vectors, such as data input vector 1203/1204 of FIGS. 12A and 12B, and may remain unchanged for the entire ten passes as the weight input vectors change.

In some embodiments, the weight input vectors shown in FIGS. 13A and 13B are weight input vectors partially unrolled from weight matrix 1101 of FIG. 11A. For example, each of weight input vectors 1303/1304, 1305/1306, 1307/1308, 1309/1310, 1311/1312, 1313/1314, 1315/1316, 1317/1318, 1319/1320, and 1321/1322 corresponds to elements from the first two rows of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1303/1304 includes row 1 of weight matrix 1101 of FIG. 11A at element locations 0-6 and row 2 at element locations 16-22. Weight input vector 1305/1306 may be prepared by shifting the elements of weight input vector 1303/1304 to the right by one location. Similarly, weight input vectors 1307/1308, 1309/1310, 1311/1312, 1313/1314, 1315/1316, 1317/1318, 1319/1320, and 1321/1322 are created by shifting the elements of weight input vectors 1305/1306, 1307/1308, 1309/1310, 1311/1312, 1313/1314, 1315/1316, 1317/1318, and 1319/1320, respectively. In some embodiments, as the weight input vectors are shifted to the right, zero-value padding elements are introduced to the front of the weight input vectors.

In some embodiments, each of the weight input vectors of FIGS. 13A and 13B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1303/1304 is broadcasted to each vector unit for pass one, weight input vector 1305/1306 is broadcasted to each vector unit for pass two, weight input vector 1307/1308 is broadcasted to each vector unit for pass three, and so forth, until weight input vector 1321/1322 is broadcasted to each vector unit for the tenth pass.

In some embodiments, weight input vectors 1303/1304, 1305/1306, 1307/1308, 1309/1310, 1311/1312, 1313/1314, 1315/1316, 1317/1318, 1319/1320, and 1321/1322 are loaded into a matrix processor unit, such as matrix processor unit 101 of FIG. 1, via a weight input vector such as weight input vector 105 of FIG. 1. In some embodiments, the partial unrolling process to create weight input vectors 1303/1304, 1305/1306, 1307/1308, 1309/1310, 1311/1312, 1313/1314, 1315/1316, 1317/1318, 1319/1320, and 1321/1322 is performed at 305 of FIG. 3, at 401 and/or 403 of FIG. 4, at 505 and/or 507 of FIG. 5, and/or at 603, 607, 609, 611, and/or 613 of FIG. 6. In some embodiments, the different weight input vectors of FIGS. 13A and 13B represent different weight input masks prepared for one iteration of a multiple iteration partial unrolling process that includes ten passes per iteration. Each of the weight input masks is a partially unrolled 2×7 mask of a 7×7 weight matrix such as weight matrix 1101 of FIG. 11A. The weight input masks are formatted to align with different 2×7 slices of a data matrix, such as data matrix 1103 of FIG. 11B. The weight masks associated with successive iterations are described with respect to FIGS. 14A, 14B, 15A, 15B, 16A, and 16B.

FIGS. 14A and 14B are diagrams illustrating an example of a partially unrolled weight matrix for performing depth-wise convolution. FIGS. 14A and 14B include index labels 1401 and 1402 that indicate the location of a weight element in a 32-element weight input vector. FIGS. 14A and 14B include ten example weight input vectors 1403/1404, 1405/1406, 1407/1408, 1409/1410, 1411/1412, 1413/1414, 1415/1416, 1417/1418, 1419/1420, and 1421/1422. The weight input vectors represent ten different weight input vectors that are broadcasted to the vector units of a matrix processor unit over ten passes. The weight input vectors of FIGS. 14A and 14B are associated with the second pair of rows of a weight matrix (rows 3 and 4). In some embodiments, data input vector 1205/1206 of FIGS. 12A and 12B is an example of a corresponding data input vector associated with the corresponding second pair of rows of a corresponding data matrix. The vector units are loaded with data input vectors, such as data input vector 1205/1206 of FIGS. 12A and 12B, and may remain unchanged for the entire ten passes as the weight input vectors change.

In some embodiments, the weight input vectors shown in FIGS. 14A and 14B are weight input vectors partially unrolled from weight matrix 1101 of FIG. 11A. For example, each of weight input vectors 1403/1404, 1405/1406, 1407/1408, 1409/1410, 1411/1412, 1413/1414, 1415/1416, 1417/1418, 1419/1420, and 1421/1422 corresponds to elements from the second pair of rows of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1403/1404 includes row 3 of weight matrix 1101 of FIG. 11A at element locations 0-6 and row 4 at element locations 16-22. Weight input vector 1405/1406 may be prepared by shifting the elements of weight input vector 1403/1404 to the right by one location. Similarly, weight input vectors 1407/1408, 1409/1410, 1411/1412, 1413/1414, 1415/1416, 1417/1418, 1419/1420, and 1421/1422 are created by shifting the elements of weight input vectors 1405/1406, 1407/1408, 1409/1410, 1411/1412, 1413/1414, 1415/1416, 1417/1418, and 1419/1420, respectively. In some embodiments, as the weight input vectors are shifted to the right, zero-value padding elements are introduced to the front of the weight input vectors.

In some embodiments, each of the weight input vectors of FIGS. 14A and 14B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1403/1404 is broadcasted to each vector unit for pass one, weight input vector 1405/1406 is broadcasted to each vector unit for pass two, weight input vector 1407/1408 is broadcasted to each vector unit for pass three, and so forth, until weight input vector 1421/1422 is broadcasted to each vector unit for the tenth pass.

FIGS. 15A and 15B are diagrams illustrating an example of a partially unrolled weight matrix for performing depth-wise convolution. FIGS. 15A and 15B include index labels 1501 and 1502 that indicate the location of a weight element in a 32-element weight input vector. FIGS. 15A and 15B include ten example weight input vectors 1503/1504, 1505/1506, 1507/1508, 1509/1510, 1511/1512, 1513/1514, 1515/1516, 1517/1518, 1519/1520, and 1521/1522. The weight input vectors represent ten different weight input vectors that are broadcasted to the vector units of a matrix processor unit over ten passes. The weight input vectors of FIGS. 15A and 15B are associated with the third pair of rows of a weight matrix (rows 5 and 6). In some embodiments, data input vector 1207/1208 of FIGS. 12A and 12B is an example of a corresponding data input vector associated with the corresponding third pair of rows of a corresponding data matrix. The vector units are loaded with data input vectors, such as data input vector 1207/1208 of FIGS. 12A and 12B, and may remain unchanged for the entire ten passes as the weight input vectors change.

In some embodiments, the weight input vectors shown in FIGS. 15A and 15B are weight input vectors partially unrolled from weight matrix 1101 of FIG. 11A. For example, each of weight input vectors 1503/1504, 1505/1506, 1507/1508, 1509/1510, 1511/1512, 1513/1514, 1515/1516, 1517/1518, 1519/1520, and 1521/1522 corresponds to elements from the third pair of rows of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1503/1504 includes row 5 of weight matrix 1101 of FIG. 11A at element locations 0-6 and row 6 at element locations 16-22. Weight input vector 1505/1506 may be prepared by shifting the elements of weight input vector 1503/1504 to the right by one location. Similarly, weight input vectors 1507/1508, 1509/1510, 1511/1512, 1513/1514, 1515/1516, 1517/1518, 1519/1520, and 1521/1522 are created by shifting the elements of weight input vectors 1505/1506, 1507/1508, 1509/1510, 1511/1512, 1513/1514, 1515/1516, 1517/1518, and 1519/1520, respectively. In some embodiments, as the weight input vectors are shifted to the right, zero-value padding elements are introduced to the front of the weight input vectors.

In some embodiments, each of the weight input vectors of FIGS. 15A and 15B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1503/1504 is broadcasted to each vector unit for pass one, weight input vector 1505/1506 is broadcasted to each vector unit for pass two, weight input vector 1507/1508 is broadcasted to each vector unit for pass three, and so forth, until weight input vector 1521/1522 is broadcasted to each vector unit for the tenth pass.

FIGS. 16A and 16B are diagrams illustrating an example of a partially unrolled weight matrix for performing depth-wise convolution. FIGS. 16A and 16B include index labels 1601 and 1602 that indicate the location of a weight element in a 32-element weight input vector. FIGS. 16A and 16B include ten example weight input vectors 1603/1604, 1605/1606, 1607/1608, 1609/1610, 1611/1612, 1613/1614, 1615/1616, 1617/1618, 1619/1620, and 1621/1622. The weight input vectors represent ten different weight input vectors that are broadcasted to the vector units of a matrix processor unit over ten passes. The weight input vectors of FIGS. 16A and 16B are associated with the last row of a weight matrix (row 7). In some embodiments, data input vector 1209/1210 of FIGS. 12A and 12B is an example of a corresponding data input vector associated with the corresponding last row of a corresponding data matrix. The vector units are loaded with data input vectors, such as data input vector 1209/1210 of FIGS. 12A and 12B, and may remain unchanged for the entire ten passes as the weight input vectors change.

In some embodiments, the weight input vectors shown in FIGS. 16A and 16B are weight input vectors partially unrolled from weight matrix 1101 of FIG. 11A. For example, each of weight input vectors 1603/1604, 1605/1606, 1607/1608, 1609/1610, 1611/1612, 1613/1614, 1615/1616, 1617/1618, 1619/1620, and 1621/1622 corresponds to elements from the last row of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1603/1604 includes row 7 of weight matrix 1101 of FIG. 11A at element locations 0-6. Weight input vector 1605/1606 may be prepared by shifting the elements of weight input vector 1603/1604 to the right by one location. Similarly, weight input vectors 1607/1608, 1609/1610, 1611/1612, 1613/1614, 1615/1616, 1617/1618, 1619/1620, and 1621/1622 are created by shifting the elements of weight input vectors 1605/1606, 1607/1608, 1609/1610, 1611/1612, 1613/1614, 1615/1616, 1617/1618, and 1619/1620, respectively. In some embodiments, as the weight input vectors are shifted to the right, zero-value padding elements are introduced to the front of the weight input vectors.

In some embodiments, each of the weight input vectors of FIGS. 16A and 16B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1603/1604 is broadcasted to each vector unit for pass one, weight input vector 1605/1606 is broadcasted to each vector unit for pass two, weight input vector 1607/1608 is broadcasted to each vector unit for pass three, and so forth, until weight input vector 1621/1622 is broadcasted to each vector unit for the tenth pass.

In some embodiments, the different weight input vectors of 14A, 14B, 15A, 15B, 16A, and 16B represent different weight input masks prepared for different iterations of a multiple iteration partial unrolling process that includes ten passes per iteration. In some embodiments, weight input vectors of FIGS. 14A and 14B are loaded into a matrix processor unit during a second iteration of a partial unrolling process; weight input vectors of FIGS. 15A and 15B are loaded into a matrix processor unit during a third iteration of a partial unrolling process; and weight input vectors of FIGS. 16A and 16B are loaded into a matrix processor unit during a fourth iteration of a partial unrolling process. Each of the weight input masks of FIGS. 14A, 14B, 15A, 15B, 16A, and 16B is a partially unrolled 2×7 mask of a 7×7 weight matrix such as weight matrix 1101 of FIG. 11A. The weight input masks are formatted to align with different 2×7 slices of a data matrix, such as data matrix 1103 of FIG. 11B. As described with respect to FIGS. 13A and 13B, the weight input vectors of FIGS. 14A, 14B, 15A, 15B, 16A, and 16B are loaded into a matrix processor unit, such as matrix processor unit 101 of FIG. 1, via a weight input vector such as weight input vector 105 of FIG. 1. In some embodiments, the partial unrolling process to create the weight input vectors of FIGS. 14A, 14B, 15A, 15B, 16A, and 16B is performed at 305 of FIG. 3, at 401 and/or 403 of FIG. 4, at 505 and/or 507 of FIG. 5, and/or at 603, 607, 609, 611, and/or 613 of FIG. 6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a matrix processor unit, including:
        a first register configured to concurrently store values of a plurality of different rows of a first matrix, wherein at least a portion of the first register is logically divided into groups of elements, and each group of the groups of elements corresponds to a different row of the first matrix;
        a group of registers, wherein each register of the group of registers is configured to concurrently store values from a plurality of different rows of a second matrix, and each register of the group of registers is configured to store zero-value padding elements; and
        a plurality of calculation units, wherein each calculation unit of the plurality of calculation units corresponds to a corresponding one of the group of registers, and each calculation unit of the plurality of calculation units is configured to multiply each value stored in the first register with a corresponding value stored in the corresponding one of the group of registers and sum together multiplication results of the corresponding calculation unit to at least in part determine a corresponding element in a result matrix of convoluting the second matrix with the first matrix.

2. The system of claim 1, wherein the first matrix is a machine learning weight matrix and the second matrix is a machine learning data matrix.

3. The system of claim 1, wherein each element of the groups of elements of the first register is separated by zero-value elements.

4. The system of claim 1, wherein each calculation unit of the plurality of calculation units includes a vector multiply unit and a vector adder unit.

5. The system of claim 4, wherein the vector adder unit includes an adder tree.

6. The system of claim 1, wherein the matrix processor unit includes a vector accumulator.

7. The system of claim 6, wherein the vector accumulator is configured to store a vector of intermediate results corresponding to partial results of convoluting the second matrix with the first matrix.

8. The system of claim 1, wherein the first register is configured to broadcast contents to each calculation unit of the plurality of calculation units.

9. The system of claim 1, wherein the first register is a flip-flop circuit.

10. The system of claim 1, wherein each value stored in the first register is a 4-bit, 8-bit, 2-byte, or 4-byte element.

11. The system of claim 1, wherein the first register includes a shifting circuit configured to shift each group of the groups of elements within the first type of register.

12. The system of claim 1, further comprising a communication bus; a data bus; and a control logic unit.

13. The system of claim 12, wherein the control logic unit is configured to receive a convolution operation instruction specifying the first matrix and the second matrix via the communication bus.

14. The system of claim 12, wherein the data bus is configured to read values of the second matrix at a multiple of a clock speed of the matrix processor unit.

15. The system of claim 1, wherein the first matrix is a 3×3, 5×5, 7×7, 9×9, or 11×11 matrix.

16. The system of claim 1, wherein the result matrix of convoluting the second matrix with the first matrix includes depthwise convolution results.

17. A method, comprising:
receiving a depthwise convolution operation instruction specifying a first matrix and a second matrix;
preparing in a first register a weight input mask using elements of the first matrix;
broadcasting the weight input mask to a plurality of vector calculation units of a matrix processor unit; and
for each vector calculation unit of the plurality of vector calculation units:
identifying a two-dimensional slice of the second matrix;
storing identified elements of the slice in a second register, wherein the second register stores zero-value padding elements;
loading stored contents of the second register into the vector calculation unit as a corresponding data input vector;
multiplying each value of the weight input mask with a corresponding value in the corresponding data input vector to determine multiplication results; and
summing together the multiplication results of the corresponding vector calculation unit to at least in part determine a corresponding element in a result matrix of convoluting the second matrix with the first matrix.

18. The method of claim 17, further comprising:
shifting the elements of the weight input mask to align elements of the weight input mask with a different set of elements of the second matrix;
broadcasting the shifted weight input mask to the plurality of vector calculation units of the matrix processor unit; and
for each vector calculation unit of the plurality of vector calculation units:
multiplying each value of the shifted weight input mask with a corresponding value in the corresponding data input vector to determine multiplication results; and
summing together the multiplication results of the corresponding vector calculation unit to at least in part determine a second corresponding element in the result matrix of convoluting the second matrix with the first matrix.

19. The method of claim 17, wherein the weight input mask includes only a subset of rows of the first matrix.

20. A system, comprising:
a shared memory; and
a plurality of processing elements configured to operate in parallel, wherein each processing element includes:
a matrix processor unit, including:
a first register configured to concurrently store values of a plurality of different rows of a first matrix, wherein at least a portion of the first register is logically divided into groups of elements, and each group of the groups of elements corresponds to a different row of the first matrix;
a group of registers, wherein each register of the group of registers is configured to concurrently store values from a plurality of different rows of a second matrix, and each register of the group of registers is configured to store zero-value padding elements; and
a plurality of calculation units, wherein each calculation unit of the plurality of calculation units corresponds to a corresponding one of the group of registers, and each calculation unit of the plurality of calculation units is configured to multiply each value stored in the first register with a corresponding value stored in the corresponding one of the group of registers and sum together multiplication results of the corresponding calculation unit to at least in part determine a corresponding element in a result matrix of convoluting the second matrix with the first matrix.

* * * * *